(12) United States Patent
Vidovic et al.

(10) Patent No.: US 11,779,910 B2
(45) Date of Patent: Oct. 10, 2023

(54) PROCESSES FOR ISOTOPIC MODIFICATION OF POLYUNSATURATED FATTY ACIDS AND DERIVATIVES THEREOF

(71) Applicant: BioJiva LLC, Los Altos, CA (US)

(72) Inventors: Dragoslav Vidovic, Belgrade (RS); Mikhail S. Shchepinov, Oxford (GB)

(73) Assignee: BioJiva LLC, Los Altos, CA (US)

( * ) Notice: Subject to any disclaimer, the term of this patent is extended or adjusted under 35 U.S.C. 154(b) by 3 days.

(21) Appl. No.: 17/180,634

(22) Filed: Feb. 19, 2021

(65) Prior Publication Data
US 2021/0269376 A1    Sep. 2, 2021

Related U.S. Application Data

(60) Provisional application No. 62/979,627, filed on Feb. 21, 2020.

(51) Int. Cl.
| | |
|---|---|
| B01J 31/16 | (2006.01) |
| C07B 59/00 | (2006.01) |
| C11C 3/00 | (2006.01) |
| B01J 31/22 | (2006.01) |

(52) U.S. Cl.
CPC ....... B01J 31/1616 (2013.01); B01J 31/2295 (2013.01); C07B 59/001 (2013.01); C11C 3/00 (2013.01); B01J 2231/40 (2013.01); B01J 2531/821 (2013.01); C07B 2200/05 (2013.01)

(58) Field of Classification Search
CPC .............. B01J 31/161; B01J 31/2295; B01J 2531/821; B01J 2231/40; C01B 59/001
See application file for complete search history.

(56) References Cited

U.S. PATENT DOCUMENTS

| | | | |
|---|---|---|---|
| 3,520,872 A | 7/1970 | Wechter et al. | |
| 4,792,620 A | 12/1988 | Paulik et al. | |
| 5,130,061 A | 7/1992 | Cornieri et al. | |
| 5,194,448 A | 3/1993 | Coupland et al. | |
| 5,436,269 A | 7/1995 | Yazawa et al. | |
| 5,709,888 A | 1/1998 | Gil et al. | |
| 5,843,497 A | 12/1998 | Sundram et al. | |
| 5,914,347 A | 6/1999 | Grinda | |
| 6,111,066 A | 8/2000 | Anderson, III et al. | |
| 6,369,247 B1 | 4/2002 | Miller et al. | |
| 6,417,233 B1 | 7/2002 | Sears et al. | |
| 6,503,478 B2 | 1/2003 | Chaiken et al. | |
| 7,271,315 B2 | 9/2007 | Metz et al. | |
| 7,381,558 B2 | 6/2008 | Barclay | |
| 10,011,620 B2 | 7/2018 | Brabet et al. | |
| 10,577,304 B2 | 3/2020 | Vidovic et al. | |
| 10,730,821 B2 | 8/2020 | Vidovic et al. | |
| 11,447,441 B2 | 9/2022 | Vidovic et al. | |
| 11,453,637 B2 | 9/2022 | Vidovic et al. | |
| 2001/0023259 A1 | 9/2001 | Slabas et al. | |
| 2002/0198177 A1 | 12/2002 | Horrobin | |
| 2004/0043013 A1 | 3/2004 | McCleary | |
| 2005/0147665 A1 | 7/2005 | Horrobin et al. | |
| 2005/0164908 A1 | 7/2005 | Ginsberg et al. | |
| 2006/0035382 A1 | 2/2006 | Shinozaki et al. | |
| 2006/0116535 A1 | 6/2006 | Ito et al. | |
| 2006/0205685 A1 | 9/2006 | Phiasivongsa et al. | |
| 2006/0241088 A1 | 10/2006 | Arterburn et al. | |
| 2007/0004639 A1 | 1/2007 | Kane et al. | |
| 2007/0032548 A1 | 2/2007 | Ellis | |
| 2008/0234197 A1 | 9/2008 | Allam et al. | |
| 2009/0054504 A1 | 2/2009 | Bozik et al. | |
| 2009/0069354 A1 | 3/2009 | Czarnik | |
| 2009/0182022 A1 | 7/2009 | Rongen et al. | |
| 2009/0215896 A1 | 8/2009 | Morseman et al. | |
| 2009/0232916 A1 | 9/2009 | Shulman et al. | |
| 2009/0306015 A1 | 12/2009 | Gately et al. | |
| 2009/0326070 A1 | 12/2009 | Freeman et al. | |
| 2010/0022645 A1 | 1/2010 | Nelson et al. | |
| 2010/0160248 A1 | 6/2010 | Shchepinov | |
| 2010/0228031 A1* | 9/2010 | Grotjahn ............... | B01J 31/2404 562/598 |
| 2011/0028434 A1 | 2/2011 | Destaillats et al. | |
| 2011/0028493 A1 | 2/2011 | Matsunaga et al. | |
| 2011/0082206 A1 | 4/2011 | Miller | |
| 2011/0105609 A1 | 5/2011 | Shchepinov | |
| 2011/0190195 A1 | 8/2011 | Atlas | |
| 2018/0339958 A1 | 11/2018 | Vidovic et al. | |

(Continued)

FOREIGN PATENT DOCUMENTS

| | | |
|---|---|---|
| CN | 1114878 A | 1/1996 |
| CN | 107569684 A | 1/2018 |

(Continued)

OTHER PUBLICATIONS

Grotjahn, D.B., et al., Extensive isomerization of alkenes using a bifunctional catalyst: An alkene zipper, Journal of the American chemical society, vol. 129, No. 31, pp. 9592-9593 (Year: 2007).*

Cunnane CS (Nov. 2003) "Problems With Essential Fatty Acids: Time for a New Paradigm?", Progress in Lipid Research, 42(6):544-568.

Do et al. (Jul. 23, 1996) "Enhanced Sensitivity of Ubiquinone-Deficient Mutants of *Saccharomyces cerevisiae* to Products of Autoxidized Polyunsaturated Fatty Acids", Proceedings of the National Academy of Sciences of the United States of America, 93(15):7534-7539.

Gould (Nov. 1986) "Salt selection for basic drugs", International Journal of Pharmaceutics, 33(1-3):201-217.

Greene et al. (Oct. 1974) "Dinitriles as Ligands. II. Derivatives of Cobalt and Nickel Perchlorates", Inorganic and Nuclear Chemistry Letters, 10(10):895-898.

(Continued)

*Primary Examiner* — Yate' K Cutliff

(74) *Attorney, Agent, or Firm* — BANNER & WITCOFF, LTD.

(57) ABSTRACT

Disclosed herein are methods for preparing isotopically modified polyunsaturated lipids containing 1,4-diene systems involving selective isotopic modification of one or more bis-allylic positions of the polyunsaturated lipids in the presence of a transition metal catalyst.

13 Claims, No Drawings

(56) References Cited

U.S. PATENT DOCUMENTS

| | | |
|---|---|---|
| 2019/0084913 A1 | 3/2019 | Vidovic et al. |
| 2020/0109103 A1 | 4/2020 | Vidovic et al. |
| 2021/0331998 A1 | 10/2021 | Vidovic et al. |

FOREIGN PATENT DOCUMENTS

| | | | |
|---|---|---|---|
| EP | 0713653 | A1 | 5/1996 |
| EP | 1548116 | A1 | 6/2005 |
| EP | 1834639 | A1 | 9/2007 |
| EP | 1961311 | A1 | 8/2008 |
| EP | 2641891 | A1 | 9/2013 |
| FR | 2721518 | A3 | 12/1995 |
| JP | H02237919 | A | 9/1990 |
| JP | H05246938 | A | 9/1993 |
| JP | H08268885 | A | 10/1996 |
| JP | H0950274 | A | 2/1997 |
| JP | H09143492 | A | 6/1997 |
| JP | H1070439 | A | 3/1998 |
| JP | H10291955 | A | 11/1998 |
| JP | 2000290291 | A | 10/2000 |
| JP | 2001145880 | A | 5/2001 |
| JP | 2001514239 | A | 9/2001 |
| JP | 2001270832 | A | 10/2001 |
| JP | 2001519355 | A | 10/2001 |
| JP | 2002513911 | A | 5/2002 |
| JP | 2002527387 | A | 8/2002 |
| JP | 2002536981 | A | 11/2002 |
| JP | 2003504333 | A | 2/2003 |
| JP | 2004081156 | A | 3/2004 |
| JP | 2004520848 | A | 7/2004 |
| JP | 2004530635 | A | 10/2004 |
| JP | 2005510501 | A | 4/2005 |
| JP | 2006502081 | A | 1/2006 |
| JP | 2006504701 | A | 2/2006 |
| JP | 2006510669 | A | 3/2006 |
| JP | 2007230876 | A | 9/2007 |
| JP | 2008504372 | A | 2/2008 |
| JP | 2008-538117 | A | 10/2008 |
| JP | 2009007337 | A | 1/2009 |
| JP | 2009502745 | A | 1/2009 |
| JP | 2009525948 | A | 7/2009 |
| JP | 2009528833 | A | 8/2009 |
| JP | 2010521493 | A | 6/2010 |
| JP | 2011502113 | A | 1/2011 |
| JP | 2013509439 | A | 3/2013 |
| KR | 20050029582 | A | 3/2005 |
| WO | WO-9956790 | A2 | 11/1999 |
| WO | WO-0021524 | A1 | 4/2000 |
| WO | WO-0117374 | A1 | 3/2001 |
| WO | WO-02096221 | A2 | 12/2002 |
| WO | WO-03035095 | A1 | 5/2003 |
| WO | WO-03051348 | A2 | 6/2003 |
| WO | WO-03064576 | A2 | 8/2003 |
| WO | WO-2004028536 | A1 | 4/2004 |
| WO | WO-2004029254 | A1 | 4/2004 |
| WO | WO-2004052227 | A1 | 6/2004 |
| WO | WO-2004060831 | A1 | 7/2004 |
| WO | WO-2005037848 | A2 | 4/2005 |
| WO | WO-2007049098 | A2 | 5/2007 |
| WO | WO-2007081910 | A2 | 7/2007 |
| WO | WO-2007102030 | A1 | 9/2007 |
| WO | WO-2008143642 | A2 | 11/2008 |
| WO | WO-2009017833 | A2 | 2/2009 |
| WO | WO-2009056983 | A1 | 5/2009 |
| WO | WO-2009097331 | A1 | 8/2009 |
| WO | WO-2009114809 | A1 | 9/2009 |
| WO | WO-2009114814 | A2 | 9/2009 |
| WO | WO-2009123316 | A1 | 10/2009 |
| WO | WO-2009151125 | A1 | 12/2009 |
| WO | WO-2010010365 | A1 | 1/2010 |
| WO | WO-2010014585 | A1 | 2/2010 |
| WO | WO-2010068867 | A1 | 6/2010 |
| WO | WO-2010106211 | A1 | 9/2010 |
| WO | WO-2010132347 | A2 | 11/2010 |
| WO | WO-2010143053 | A1 | 12/2010 |
| WO | WO-2011053870 | A1 | 5/2011 |
| WO | WO-2011097273 | A1 | 8/2011 |
| WO | WO-2012148926 | A2 | 11/2012 |
| WO | WO-2012148927 | A2 | 11/2012 |
| WO | WO-2012148929 | A2 | 11/2012 |
| WO | WO-2012148930 | A2 | 11/2012 |
| WO | WO-2012174262 | A2 | 12/2012 |
| WO | WO-2015138773 | A2 | 9/2015 |
| WO | WO-2015162265 | A1 | 10/2015 |
| WO | 2017091279 | A1 | 6/2017 |
| WO | 2021168311 | A1 | 8/2021 |

OTHER PUBLICATIONS

Huynh et al. (2011) "Syntheses and Catalytic Activities of Pd(II) Dicarbene and Hetero-Dicarbene Complexes", Journal of Organometallic Chemistry, 696(21):3369-3375.

Naik et al. (2010) "Iron(II)-bis(Isonitrite) Complexes: Novel Catalysts in Asymmetric Transfer Hydrogenations of Aromatic and Heteroaramatic Ketones", Chemical Communications, 46(25):4475-4477.

Negre-Salvayre et al. (2008) "Advanced Lipid Peroxidation End Products in Oxidative Damage to Proteins. Potential Role in Diseases and Therapeutic Prospects for the Inhibitors", British Journal of Pharmacology, 153(1):6-20.

Smarun et al. (2017) "Site-Specific Deuteration of Polyunsaturated Alkenes", The Journal of Organic Chemistry, 82:13115-13120.

Sun et al. (Apr. 14, 2004) "Oxidative Fragmentation of Hydroxy Octadecadienoates Generates Biologically Active γ-Hydroxyalkenals", Journal of the American Chemical Society, 126(18):5699-5708.

Hesk David, (2019) "Highlights of C (sp2)-H Hydrogen Isotope Exchange Reactions", Journal of labelled compounds and radiopharmaceuticals, 63(6):247-265.

Huang et al., (1999) "14-Electron Four-Coordinate Ru(II) Carbyl Complexes and Their Five-Coordinate Precursors: Synthesis, Double Agostic Interactions, and Reactivity", Journal of the American Chemical Society, 121(35):8087-8097.

Zhang et al., (2009) "Ruthenium-Catalyzed Nucleophilic Allylic Substitution Reactions from Beta-Silylated Allylic Carbonates", Organometallics, 28(17):5173-5182.

Adams et al., Case Report: Expanded Access Treatment of an Infantile Neuroaxonal Dystrophy (INAD) Patient with a Novel, Stabilized Polyunsaturated Fatty Acid Drug, American Academy of Neurology conference, poster session, Apr. 2018.

Adhikary et al., UVA-visible photo-excitation of guanine radical cations produces sugar radicals in DNA and model structures. Nucleic Acids Research 33(17):5553-5564 (2005).

Aldrich Handbook of Fine Chemicals and Laboratory Equipment, p. 811 (2002).

Andreyev et al. Isotope-Reinforced Polyunsaturated Fatty Acids Protect Mitochondria from Oxidative Stress. Free Radical Biology and Medicine 82:63-72 (2015).

Angelova et al., Lipid peroxidation is essential for α-synuclein-induced cell death. J Neurochem. 133(4):582-589 (2015).

Angulo et al., Non-alcoholic fatty liver disease. Journal of Gastroenterology and Hepatology 17 Suppl.:S186-190 (2002).

Asada et al; Stereochemistry of meso-a,e Diaminopimelate Decarboxylase Reaction: The First Evidence for Pyriodoxal 5'-Phosphate Dependant Decarboxylation with Inversion of Configuration. Biochemistry 20(24):6881-6886 (1981).

Asfari et al., Molecular modelling and chemical synthesis of molecular 'mappemondes' designed from a calix[4]-bis-crown. Tetrahedron Letters 37(19):3325-3328 (1996).

Atzrodt et al., The renaissance of H/D exchange. Angew Chem Int Ed Engl. 46(41):7744-7765 (2007).

Australian Patent Application No. 2021225202 Office Action dated Apr. 13, 2022.

Bada et al; Isotopic Fractionation During Peptide Bond Hydrolysis. Geochimica et Cosmoschimica Acta 53:3337-3341 (1989).

Balasubramanian et al; DNA strand breaking by the hydroxyl radical is governed by the accessible surface areas of the hydrogen atoms of the DNA backbone. Proc. Natl. Acad. Sci. USA 95:9738-9743 (1998).

(56) References Cited

OTHER PUBLICATIONS

Barber et al., Oxidative stress in ALS: a mechanism of neurodegeneration and a therapeutic target. Biochimica et Biophysica Acta 1762:1051-1067 (2006).

Barton et al., Radical mono- and dideoxygenations with the triethylsilane plus benzoyl peroxide system. Tetrahedron Letters 32(49):7187-7190 (1991).

Brandl et al; The biosynthesis of 3-(trans-2-Nitrocyclopropyl)alanine, a Constituent of the Signal Metabolite Hormaomycin. European Journal of Organic Chemistry 2005(1):123-135 (2004).

Brenna et al; a-Linolenic acid supplementation and conversionton to n-3 long-chain polyunsaturated fatty acids in humans. Prostaglandins, Leukotrienes and Essential Fatty Acids 80:85-91 (2009).

Brenna et al; High-Precision Continuous-Flow Isotope Ratio Mass Spectrometry. Mass Spectrometry Review 16:227-258 (1997).

Brenna, J.T.; Efficiency of conversion of a-linolenic acid to long chain n-3 fatty acids in man. Lipid Metabolism. Curr Opin Clin Nutr Metab Care 5(2):127-132 (2002).

Brenna, J.T.; Use of stable isotopes to study fatty acid and lipoprotein metabolism in man. Prostaglandins, Leukotrienes and Essential Fatty Acids 57(4 & 5):467-472 (1997).

Brook et al., Reaction of a silene with a siliscyclopropane to yield a disiliscyclopropone. Organometallics 4(8):1487-1488 (1985).

Burdzy et al; Synthesis of stable-isotope enriched 5-methylpyrimidines and their use as probes of base reactivity in DNA. Nucleic Acids Research 30(18):4068-4074 (2002).

Catino et al., Dirhodium(II) caprolactamate: an exceptional catalyst for allylic oxidation. J Am Chem Soc. 126(42):13622-13623 (2004).

Chen et al., One-Pot Selective Deuteriation of 5'-Dimethoxytritylated Deoxynucleotide Derivatives. Bioorgainc & Medicinal Chemistry Letters 4(6):789-794 (1994).

Chiriac et al; Synthesis of [1,3,6,7-15N, 8-13C] adenine. Journal of Labelled Compounds and Radiopharmaceuticals 42(4):377-385 (1999).

Cho et al; Cooperativity and anti-cooperativity between ligand binding and the dimerization of ristocetin A: asymmetry of a homodimer complex and implications for signal transduction. Chemistry & Biology 3(3):207-215 (1996).

Choi et al., Optimal TBHP allylic oxidation of Delta5-steroids catalyzed by dirhodium caprolactamate. Org Lett. 9(26):5349-5352 (2007).

Cicalese Lucas, Hepatocellular carcinoma. Medscape:1-5 (2014).

Clarke et al., Isotope-reinforced polyunsaturated fatty acids protect yeast cells from oxidative stress. FASEB J. 24:849.2 (2010).

Corberan et al., Highly stable Cp*-Ir(III) complexes with N-heterocyclic carbene ligands as C—H activation catalysts for the deuteration of organic molecules. J Am Chem Soc. 128(12):3974-3979 (2006).

Cotticelli et al., Insights into the role of oxidative stress in the pathology of Friedreich ataxia using peroxidation resistant polyunsaturated fatty acids. Redox Biol. 1(1):398-404 (2013).

Crombie et al, Synthesis of [14,14-2H2]-linolenic acid and its use to confirm the pathway to 12-oxophytodienoic acid (12-oxoPDA) in plants: a conspectus of the epoxycarbonium ion derived family of metabolites from linoleic and linolenic acid hydroperoxides. Journal of the Chemical Society, Perkin Transactions 1(3):581-587 (1991).

Dalle-Donne et al; Protein carbonylation in human diseases. Trends in Molecular Medicine 9(4):169-176 (2003).

De Sain-Van Der Velden et al., Increased VLDL in nephrotic patients results from a decreased catabolism while increased LDL results from increased synthesis. Kidney Int. 53(4):994-1001 (1998).

Demidov, V.; Heavy isotopes to avert ageing? Trends in Biotechnology 25(9):371-375 (2007).

Dentistry Dictionary reduced-size edition. Oct. 10, 1989, the first edition, p. 2216-2217 (1989).

Dorwald, Side Reactions in Organic Synthesis. Wiley-VCH, 1-16 (2005).

Duncan et al., A nonsense mutation in COQ9 causes autosomal-recessive neonatal-onset primary coenzyme Q10 deficiency: a potentially treatable form of mitochondrial disease. The American Journal of Human Genetics 84:558-566 (2009).

Dyall et al, Neurological benefits of Omega-3 Fatty Acids. Neuromolecular Medicine 10(4):219-235 (2008).

Elharram et al., Deuterium-reinforced polyunsaturated fatty acids improve cognition in a mouse model of sporadic Alzheimer's disease. The FEBS Journal 284(23):4083-4095 (2017).

Emken et al; Effect of Dietary Docosahexaenoic Acid on Desaturation and Uptake in vivo of Isotope-Labeled Oleic, Linoleic, and Linolenic Acids by Male Subjects. Lipids 34(8):785-791 (1999).

Emken et al., Influence of linoleic acid on desaturation and uptake of deuterium-labeled palmitic and stearic acids in humans. Biochim Biophys Acta. 1170(2):173-181 (1993).

Emken et al; Metabolism of cis-12-octadecenoic acid and trans-9, trans-12-octadecadienoic acid and their influence on lipogenic enzyme activities in mouse liver. Biochimica et Biophysica Acta 919:111-121 (1987).

Erdogan et al., Catalysis of selective hydrogen/deuterium exchange at allylic positions using deuterium oxide. Topics in Catalysis 53(15): 1055-1058 (2010).

Erdogan et al., Mild and selective deuteration and isomerization of alkenes by a bifunctional catalyst and deuterium oxide. J Am Chem Soc. 131(30):10354-10355 (2009).

Esaki et al; Synthesis of base-selectively deuterium-labelled nucleosides by the Pd/C-Catalyzed H-D Exchange Reaction in Deuterium Oxide. Heterocycles 66:361-369 (2005).

Evans et al, ENDOR, triple resonance and ESR studies of spin-trapped radicals in autoxidized linoleic acid and its deuterated derivatives. Biochimica et Biophysica Acta, Elsevier Science BV, Amsterdam, NL 835(3):421-425 (1985).

Extended European Search Report for European Application No. 12776294 dated Sep. 25, 2014 by European Patent Office.

Extended European Search Report for European Application No. 12777440 dated Sep. 17, 2014 by European Patent Office.

Faller et al., Stereoselective vinylic carbon-hydrogen activation by a homogeneous iridium catalyst. Organometallics 8(3):602-609 (1989).

Feng et al., Effect of ancillary ligands and solvents on H/D exchange reactions catalyzed by cp-lr complexes. Organometallics 29(13):2857-2867 (2010).

Finglas et al, Use of an oral/intravenous dual-label stable-isotope protocol to determine folic acid bioavailability from fortified cereal grain foods in women. The Journal of Nutrition 132(5):936-939 (2002).

Firsov et al. Threshold Protective Effect of Deuterated Polyunsaturated Fatty Acids on Peroxidation of Lipid Bilayers. The FEBS Journal, 286(11):2099-2117 (2019).

Foldesi et al; The Synthesis of Deuterionucleosides; Nucleosides, Nucleotides and Nucleic Acids 19(10-12):1615-1656 (2000).

Furrow et al., Practical procedures for the preparation of N-tert-butyldimethylsilylhydrazones and their use in modified Wolff-Kishner reductions and in the synthesis of vinyl halides and gem-dihalides. J Am Chem Soc. 126(17):5436-5445 (2004).

Gant. Using Deuterium in Drug Discovery: Leaving the Label in the Drug. J. Med. Chem. 57(9):3595-3611 (2014).

Geboes et al, Validation of a new test meal for a protein digestion breath test in humans. The Journal of Nutrition 134(4):806-810 (2004).

Giordano, F. J., Oxygen, oxidative stress, hypoxia, and heart failure. The Journal of Clinical Investigation 115(3):500-508 (2005).

Giuseppe et al., Mild and selective H/D exchange at the β position of aromatic α-olefins by N-heterocyclic carbene-hydride-rhodium catalysts. Angew Chem Int Ed Engl. 50(17):3938-3942 (2011).

Gueraud et al., Chemistry and biochemistry of lipid peroxidation products. Free Radical Research 44(10):1098-1124 (2010).

Hammarstrom et al., Stereospecific elimination of hydrogen at C-10 in eicosapentaenoic acid during the conversion to leukotriene C5. J Biol Chem. 258(3):1427-1430 (1983).

Handbook of Chemistry and Physics; CRC Press, pp. B228-B229 (1989).

Harman, Deham; The Free Radical Theory of Aging. Antioxidants & Redox Signaling 5(5):557-561 (2003).

Harman, Denham; Aging and Oxidative Stress. Journal of International Federation of Clinical Chemistry (JIFCC) 10(1):24-26 (1998).

(56) References Cited

OTHER PUBLICATIONS

Hatano et al., Selective H/D Exchange at Vinyl and Methylidene Groups with D2O Catalyzed by an Iridium Complex. Org Lett. 18(15):3674-3677 (2016).

Hill et al. Isotope-reinforced polyunsaturated fatty acids protect yeast cells from oxidative stress. Free Radical Biology & Medicine 50:130-138 (2011).

Hill et al., Small amounts of isotope-reinforced polyunsaturated fatty acids suppress lipid autoxidation. Free Radical Biology and Medicine 53:893-906 (2012).

Hulme et al; Chemistry and the Worm: Caenorhabditis elegans as a Platform for Integrating Chemical and Biological Research. Chemical Biology; Angewandte Chemie International Edition 50:4774-4807 (2011).

Hussein, N., Long-chain conversion of [13C] linoleic acid and -linoleic acid in response to marked changes in their dietary intake in men. Journal of Lipid Research 46(2):269-280 (2004).

Ikeya et al; Evaluation of stereo-array isotope labeling (SAIL) patterns for automated structural analysis of proteins with CYANA. Magnetic Resonance in Chemistry 44:S152-S157 (2006).

International Search Report and Written Opinion for PCT/US2016/051119 dated Dec. 8, 2016.

International Search Report dated Jun. 12, 2007 for PCT/GB2007/050112.

Iyengar Venkatesh et al., Nuclear and Isotopic Techniques for Addressing Nutritional Problems, with Special Reference to Current Applications in Developing Countries. Food and Nutrition Bulletin 23(1):3-10 (2022).

Jacquot et al., Isotope Sensitive Branching and Kinetic Isotope Effects in the Reaction of Deuterated Arachidonic Acids with Human 12- and 15-Lipoxygenases. Biochemistry 47(27):7295-7303 (2008).

Japanese Journal of Clinical Medicine (Separate Volume) Syndrome classified as New Fields Series 13 Liver/Biliary Tract-based Syndrome (second edition) I Liver edition (the first volume) Sep. 20, 2010 p. 196 to 201 (2010).

Johnson et al, Potential role of dietary n-3 fatty acids in the prevention of dementia and macular degeneration. The American Journal of Clinical Nutrition 83(6):S1494-1498S (2006).

Junk et al., Hydrogen isotope exchange reactions involving C—H (D, T) bonds. Chern. Soc. Rev. 26:401-406 (1997).

Kelland et al; Stereochemistry of Lysine Formation by meso-Diaminopimelate Decarboxylase from Wheat Germ: Use of 1H-13C NMR Shift Correlation to Detect Stereospecific Deuterium Labeling. Biochemistry 24(13):3263-2367 (1985).

Kelly et al; Assessing the authenticity of single seed vegetable oils using fatty acid stable carbon isotope ratios (13C/12C). Food Chemistry 59(2):181-186 (1997).

Khaskin et al., Simple and Efficient Catalytic Reaction for the Selective Deuteration of Alcohols. ACS Catal. 3(3):448-452 (2013).

King et al., Mitochondria-derived reactive oxygen species mediate blue light-induced death of retinal pigment epithelial cells. Photochem Photobiol. 79(5):470-475 (2004).

Kishore et al; Partial 13C Isotopic Enrichment of Nucleoside Monophosphates: Useful Reporters for NMR Structural Studies. Nucleic Acids Research 33(18):e164 (2005).

Knapp et al; Temperature-dependent isotope effects in soybean lipoxygenase-I : Correlating hydrogen tunneling with protein dynamics. JACS Articles; J. Am. Chem. Soc. 124:3865-3874 (2002).

Koritala et al, Deuteration of methyl linoleate with nickel, palladium, platinum and copper-chromite catalysts. Journal of the American Oil Chemists Society 50:310-316 (1973).

Krishnamurthy et al., Facile reduction of alkyl tosylates with lithium triethylborohydride. An advantageous procedure for the deoxygenation of cyclic and acyclic alcohols. J. Org. Chem. 41(18):3064-3066 (1976).

Krishnamurthy et al., Rapid reduction of alkyl tosylates with lithium triethylborohydride. A convenient and advantageous procedure for the deoxygenation of simple and hindered alcohols. Journal of Organometallic Chemistry 156(1):171-181 (1978).

Kurita et al., Efficient and convenient heterogeneous palladium-catalyzed regioselective deuteration at the benzylic position. Chemistry 14(2):664-673 (2008).

Kushner et al; Pharmacological uses and perspectives of heavy water and deuterated compounds. Canadian Journal of Physiology and Pharmacology 77:79-88 (1999).

Lamberson et al., Unusual kinetic isotope effects of deuterium reinforced polyunsaturated fatty acids in tocopherol-mediated free radical chain oxidations. J Am Chem Soc. 136(3):838-841 (2014).

Lambert D. Rationale and applications of lipids as prodrug carriers. European Journal of Pharmaceutical Sciences. 11(Suppl.2):S15-S27 (2000).

Lee et al., Catalytic H/D exchange of unactivated aliphatic C—H bonds. Organometallics 21(21):6599-6604 (2013).

Lefkowitz et al; Where Does the Developing Brain Obtain Its Docosahexaenoic Acid? Relative Contributions of Dietary a-Linolenic Acid, Docosahexaenoic Acid, and Body Stores in the Developing Rat. Pediatric Research 57(1):157-165 (2005).

Lei et al., Dietary omega-3 Polyunsaturated Fatty Acids Enhance Adiponectin Expression and Protect Against Pressure Overload-Induced Left Ventricular Hypertrophy and Dysfunction. Journal of Cardial Failure, Churchill Livingstone, Naperville, IL, US 13(6):S79 (2007).

Levenson et al; The Healing of Rat Skin Wounds. Annals of Surgery 161(2):293-308 (1965).

Lichtenstein et al; Comparison of deuterated leucine, valine and lysine in the measurement of human apolipoprotein A-I and B-100 kinetics. Journal of Lipid Research 31(9):1693-1702 (1990).

Lin et al; Whole body distribution of deuterated linoleic and a-linolenic acids and their metabolites in the rat. Journal of Lipid Research 48:2709-2724 (2007).

Liuzzi et al., Inhibitory effect of polyunsaturated fatty acids on MMP-9 release from microglial cells—implications for complementary multiple sclerosis treatment. Neurochem. Res. 32:2184-2193 (2007).

Lowry et al., Definition: carpene. Mechanism and Theory in Organic Chemistry: 256 (1976).

Machteld Von Lieshout et al., Isotopic tracer techniques for studying the bioavailability and bioefficacy of dietary carotenoids, particularly beta-carotene, in humans: a review. Am J Clin Nutr. 77(1):12-28 (2003).

Maity et al., Metal center dependent coordination modes of a tricarbene ligand. Chem Commun (Camb). 49(10):1011-1013 (2013).

Mantena et al., Mitochondrial dysfunction and oxidative stress in the pathogenesis of alcohol- and obesity-induced fatty liver diseases. Free Radical Biology & Medicine 44(7):1259-1272 (2008).

Mattison et al., Rapid identification of dihydropyrimidine dehydrogenase deficiency by using a novel 2-13C-uracil breath test. Clin Cancer Res. 10(8):2652-2658 (2004).

Mazza et al, Omega-3 fatty acids and antioxidants in neurological and psychiatric diseases: An overview. Progress in Neuro-Psychopharmacology & Biological Psychiatry, Oxford 31(1):12-26 (2007).

Mitsumoto et al., Oxidative stress biomarkers in sporadic ALS Amyotroph Lateral Scler. 9(3):177-183 (2008).

Nass et al; Caenorhabditis elegans in Parkinson's Disease Drug Discovery: Addressing an Unmet Medical Need; Molecular Interventions 8(6):284-293 (2008).

Nelson et al., Reduction of beta-Amyloid Levels by Novel Protein Kinase C epsilon Activators. Journal of Biological Chemistry 284(50):34514-34521 (2009).

Neubert et al., Ruthenium-catalyzed selective α,β-deuteration of bioactive amines. J Am Chem Soc. 134(29):12239-12244 (2012).

Nobuo Tamiya and Takehiko Shimanouchi; Infra-red absorption spectra of deuterated aspartic acids. Spectrochimica Acta 18(7):895-905 (1962).

Norskov et al., Towards the computational design of solid catalysts. Nat Chem. 1(1):37-46 (2009).

Notice of Reasons for Rejection dated Aug. 24, 2011 for Japanese Patent Application No. 2008-557833.

Notice of Reasons of Rejection dated Sep. 17, 2020 received in related Japanese Patent Application No. 2018-526719 with English translation.

(56) References Cited

OTHER PUBLICATIONS

Office Action for Japanese Patent Application No. 2014-508486 dated Dec. 25, 2015.
Office Action for Japanese Patent Application No. 2014-508487 dated Dec. 3, 2015.
Office Action for Japanese Patent Application No. 2014-508488 dated Dec. 4, 2015.
Office Action for Japanese Patent Application No. 2014-508489 dated Dec. 25, 2015.
Office Action for U.S. Appl. No. 14/551,450 dated Apr. 15, 2015 by U.S. Patent and Trademark Office.
Ovide-Bordeaux et al., Dicisahexaeniuc acid affects insulin deficiency- and insulin resistance-induced alterations in cardiac mitochondria. Am J Physiol Regul Interg Comp Physiol 286:R519-R527 (2004).
Pedersen et al., Protein modification by the lipid peroxidation product 4-hydroxynonenal in the spinal cords of amyotrophic lateral sclerosis patients. Annals of Neurology 44(5):819-824 (1998).
Peng et al., Synthesis of site-specifically labeled arachidonic acids as mechanistic probes for prostaglandin H synthase. Org Lett. 6(3):349-352 (2004).
Prechtl et al., H/D exchange at aromatic and heteroaromatic hydrocarbons using D2O as the deuterium source and ruthenium dihydrogen complexes as the catalyst. Angew Chem Int Ed Engl. 46(13):2269-2272 (2007).
Raap et al; Enantioseletive syntheses of isotopically labeled a-amino acids. Preparation of (c-13C)-L-a-aminoadipic acid and five isotopomers of L-lysine with 13C, 15N, and 2H in the b- and c-positions. Recueil de Travaux Chimiques de Pays-Bas 109(4):277-286 (1990).
Rapoport et al; Delivery and turnover of plasma-derived essential PUFAs in mammalian brain. Journal of Lipid Research 42:678-685 (2001).
Reddy P. H., Mitochondrial medicine for aging and neurodegenerative diseases. Neuromolecular Med. 10(4):291-315 (2008).
Ren et al; Simultaneous metabolic labeling of cells with multiple amino acids: localization and dynamics of histone acetylation and methylation. Proteomics: Clinical Applications 1(1):130-142 (2007).
Riediger et al., A Systemic Review of the Roles of n-3 Fatty Acids in Health and Disease. Journal of the American Dietetic Association 109(4):668-679 (2009).
Rohwedder et al; Measurement of the Metabolic Interconversion of Deuterium-Labeled Fatty Acids by Gas Chromatography/Mass Spectrometry. Lipids 25(7):401-405 (1990).
Rosell et al., Total Syntheses of Two bis-Allylic-Deuterated DHA Analogues. Asian Journal of Organic Chemistry 6(3):322-334 (2017).
Rosen et al; Effect of Deuterium Oxide on Wound Healing, Collagen and Metabolism of Rats. New England Journal of Medicine 270(22):1142-1149 (1964).
Rustin et al., Effect of idebenone on cardiomyopathy in Friedreich's ataxia: a preliminary study. Lancet 354(9177):477-479 (1999).
Rybtchinski et al., Aromatic vs aliphatic C—H bond activation by rhodium(I) as a function of agostic interactions: catalytic H/D exchange between olefins and methanol or water. J Am Chem Soc. 125(36):11041-11050 (2003).
Sajiki Hironao et al., Development of deuterium labeling method based on the heterogeneous platinum group metal-catalyzed C—H activation. Yakugaku Zasshi: Journal of the Pharmaceutical Society of Japan 133(11):1177-1193 (2013).
Salem et al; Arachidonic and docosahexaenoic acids are biosynthesized from their 18-carbon precursors in human infants. Proc. Natl. Acad. Sci. 93:49-54 (1996).
Scholl et al; Synthesis of 5,5,6,6-D4-L-lystine-aflatoxin B1 for use as a mass spectrometric internal standard. Journal of Labelled Compounds & Radiopharmaceuticals 47(11):807-815 (2004).
Schutt et al., Proteins modified by malondialdehyde, 4-hydroxynonenal, or advanced glycation end products in lipofuscin of human retinal pigment epithelium. Invest Ophthalmol Vis Sci. 44(8):3663-3668 (2003).
Separate Volume/Advances in Medical Science Oxidative Stress Ver.2 Oct. 5, 2006:23-27 (2006).
Serhiyenko V et al., Simvastatin and Omega-Polyunsaturated Fatty Acids in the Treatment of Cardiomyopathy in Type 2 Diabetes Mellitus Patients. Atherosclerosis Supplements, Elsevier, Amsterdam, NL 9(1):203 (2008).
Shah et al., Resolving the Role of Lipoxygenases in the Initiation and Execution of Ferroptosis, ACS Cent. ScL 4(3):387-396 (2018).
Shchepinov et al., Do "heavy" eaters live longer? Bioessays 29(12):1247-1256 (2007).
Shchepinov et al. Isotope effect, essential diet components, and prospects of aging retardation. Russian Journal of General Chemistry 80(7):1514-1522 (2010).
Shchepinov et al, Isotopic reinforcement of essential polyunsaturated fatty acids diminishes nigrostriatal degeneration in a mouse model of Parkinson's disease. Toxicology Letter, Elsevier Biomedical Press, Amsterdam, NL 207(2):97-103 (2011).
Shchepinov et al., Mitigating effects of oxidation in aging and diseases. Retrotope. 2010; 1-11 (2010).
Shchepinov, Mikhail; Reactive Oxygen Species, Isotope Effect, Essential Nutrients, and Enhanced Longevity. Rejuvenation Research 10(1):47-59 (2007).
Shilov et al., Activation of Cminus signH Bonds by Metal Complexes. Chem Rev. 97(8):2879-2932 (1997).
Shoten Iwanami, Eicosapentaenoic acid. Biodictionary 114 (1997).
Simpson et al., Increased lipid peroxidation in sera of ALS patients: a potential biomarker of disease burden. Neurology 62(10):1758-1765 (2004).
Steines et al., Stereoselective catalytic hydrogenation of sorbic acid and sorbic alcohol with new Cp*Ru complexes. Chem. Commun. 3:217-218 (2000).
Sumbalova et al., Brain energy metabolsms in experimental chronic diabetes: effect of long-term administration of coenzyme 10 and w-3 polyunsaturated fatty acids. Biologia Bratislava 60(17):105-108 (2005).
Supplementary European Search Report & Written Opinion dated Jun. 5, 2013 for EP Application No. 10827578.5.
Svedruzic et al; The Mechanism of Target Base Attack in DNA Cytosine Carbon 5 Methylation. Biochemistry 43(36):11460-11473 (2004).
Taber et al., Preparation of deuterated arachidonic acid. Prostaglandins 22(3):349-352 (1981).
Tang et al; Kinetic and biochemical analysis of the mechanism of action of lysine 5, 6-aminomutase. Archives of Biochemistry and Biophysics 418(1):49-54 (2003).
Tao et al., Mechanism of alkene isomerization by bifunctional ruthenium catalyst: A theoretical study. Journal of Organometallic Chemistry 698:1-6 (2012).
The extended European search report for European Application No. 12776313 dated Sep. 17, 2014.
The extended European search report for European Application No. 12776521 dated Sep. 17, 2014.
Townend et al., Dietary Macronutrient Intake and Five-year Incident Cataract: The Blue Mountains Eye Study. American Journal of Ophthalmology, Elsevier, Amsterdam, NL 143(6):932-939 (2007).
Toyama et al; Assignments and hydrogen bond sensitivities of UV resonance Raman bands of the C8-deuterated guanine ring. Journal of Raman Spectroscopy 33(9):699-708 (2002).
Triglycerides. Medium chain triglycerides. Alternative Medicine Review 7(5): 418-420 (2002).
Tse et al., Hydrogen/Deuterium Exchange Reactions of Olefins with Deuterium Oxide Mediated by the Carbonylchlorohydridotris(triphenylphosphine)ruthenium(II) Complex. Advanced Synthesis & Catalysis 352(9):1512-1522 (2010).
Tse et al., Ruthenium-catalyzed regioselective deuteration of alcohols at the β-carbon position with deuterium oxide. Chemistry 17(49):13918-13925 (2011).
Tucker et al; The synthesis of 11,11-Dideuterolinoleic Acid. Journal of Labelled Compounds 7(1):11-15 (1970).
U.S. Appl. No. 15/778,182 Office Action dated Nov. 12, 2019.
U.S. Appl. No. 15/778,182 Restriction Requirement dated Aug. 19, 2019.
U.S. Appl. No. 16/192,387 Office Action dated Mar. 11, 2019.
U.S. Appl. No. 16/192,387 Office Action dated Sep. 4, 2019.
U.S. Appl. No. 17/412,797 Office Action dated Feb. 2, 2022.

(56) References Cited

OTHER PUBLICATIONS

Veldink et al., Intake of polyunsaturated fatty acids and vitamin E reduces the risk of developing amyotrophic lateral sclerosis. J Neuro Neurosurg. Psychiatry 78(4):367-371 (2007).

Vertes et al., Physiological effect of heavy water. Handbook of Nuclear Chemistry 2:110-116 (2003).

Viswanathan and Cushley, Deuterium Nuclear Magnetic Resonance Study of the Interaction of Substrates and Inhibitors with Soybean Lipoxygenase. The Journal of Biological Chemistry 256(14):7155-7160 (1981).

Vowinkel et al., A simple method for the reduction of alcohols to hydrocarbons. Chemische Berichte 107:1353-1359 (1974).

Wade, David; Deuterium isotope effects on noncovalent interactions between molecules. Chemico-Biological Interactions 117(3):191-217 (1999).

Watanabe et al., A radical deoxygenation of secondary alcohols to hydrocarbons by use of tributyltin hydride. Tetrahedron Letters 27(44):5385-5388 (1986).

Wendt et al., Mass spectrometry of perdeuterated molecules of biological origin fatty acid esters from Scenedesmus obliquus. Biochemistry 9(25):4854-4866 (1970).

Wheeler et al., The Synthesis of the 2H, 3H, and 14C-Isotopomers of 2'-Deoxy-2', 2'-Difourocytidine Hydrochloride, and Anti-Tumor Compound; Journal of Labelled Compounds and Radiopharmaceuticals 29(5):583-589 (1991).

Wilczynska-Kwiatek A et al., Asthma, allergy, mood disorders, and nutrition. European Journal of Medical research, Biomed Central Ltd. London, UK 14(Suppl 4):248-254 (2009).

Written Opinion dated Sep. 8, 2008 for PCT/GB2007/050112.

Yamauchi et al., Observation of the Pathway from Lysine to Isoprenoidal Lipid of Halophilic Archaea, Halobacterium halobium and Natrinema pallidum, Using Regiospecifically Deuterated Lysine. Bull. Chem. Soc. Jpn. 74:2199-2205 (2001).

Yashodhara et. al., Omega-3 fatty acids: a comprehensive review of their role in health and disease. Postgrad Med J. 85: 84-90 (2009).

Yasuji et al., Primary sclerosing cholangitis and carcinogenesis. Journal of Biliary Tract & Pancreas 26(4):351-357 (2005).

Yoneya, et al., Genetic polymorphisms as risk factors for coronary artery disease. Japanese Journal of Clinical Medicine 56(10):51-56; 2509-2514 (1998).

Yu et al., Iron-catalysed tritiation of pharmaceuticals. Nature 529(7585):195-199 (2016).

Yung et al., Stoichiometric and catalytic H/D incorporation by cationic iridium complexes: a common monohydrido-iridium intermediate. J Am Chem Soc. 126(40):13033-13043 (2004).

Zesiewicz et al., Randomized, Clinical Trial of RT001: Early Signals of Efficacy in Friedreich's Ataxia, Published online Apr. 6, 2018 in Wiley Online Library (wileyonlinelibrary.com). Mov Disord. 33(6):1000-1005 DOI: 10.1002/mds.27353 (2018).

Notice of Reasons for Refusal dated Jan. 16, 2023, in Japanese Patent Application No. 2021-198937 (4 pages) with an English translation (4 pages).

\* cited by examiner

PROCESSES FOR ISOTOPIC MODIFICATION OF POLYUNSATURATED FATTY ACIDS AND DERIVATIVES THEREOF

CROSS-REFERENCES TO RELATED APPLICATIONS

This application claims priority to U.S. Provisional Application No. 62/979,627 filed Feb. 21, 2020, which is incorporated herein in its entirety for all purposes.

BACKGROUND

Field

Isotopically modified polyunsaturated lipids, mixture of isotopically modified polyunsaturated lipids, methods of making such compounds or mixtures thereof, pharmaceutical compositions and medicaments comprising such compounds or mixtures, and uses of such compounds or mixtures to treat, prevent or alleviate various diseases, disorders, or conditions related to lipid peroxidation are provided.

Description of the Related Art

Oxidative damage is implicated in a wide variety of diseases including, but not limited to, mitochondrial diseases, neurodegenerative diseases, neurodegenerative muscle diseases, retinal diseases, energy processing disorders, kidney diseases, hepatic diseases, lipidemias, cardiac diseases, inflammation, and genetic disorders.

While the number of diseases associated with oxidative stress are numerous and diverse, it is well established that oxidative stress is caused by disturbances to the normal redox state within cells. An imbalance between routine production and detoxification of reactive oxygen species ("ROS") such as peroxides and free radicals can result in oxidative damage to cellular structures and machinery. Under normal conditions, a potentially important source of ROSs in aerobic organisms is the leakage of activated oxygen from mitochondria during normal oxidative respiration. Additionally, it is known that macrophages and enzymatic reactions also contribute to the generation of ROSs within cells. Because cells and their internal organelles are lipid membrane-enveloped, ROSs can readily contact membrane constituents and cause lipid oxidation. Ultimately, such oxidative damage can be relayed to other biomolecules within the membrane and the cell, such as proteins and DNA, through direct and indirect contact with activated oxygen, oxidized membrane constituents, or other oxidized cellular components. Thus, one can readily envision how oxidative damage may propagate throughout a cell give the mobility of internal constituents and the interconnectedness of cellular pathways.

Lipid-forming fatty acids are well-known as one of the major components of living cells. As such, they participate in numerous metabolic pathways, and play an important role in a variety of pathologies. Polyunsaturated Fatty Acids ("PUFAs") are an important sub-class of fatty acids. An essential nutrient is a food component that directly, or via conversion, serves an essential biological function and which is not produced endogenously or in large enough amounts to cover the requirements. For homeothermic animals, the two rigorously essential PUFAs are linoleic (cis,cis-9,12-Octadecadienoic acid; (9Z,12Z)-9,12-Octadecadienoic acid; "LA"; 18:2; n-6) and alpha-linolenic (cis,cis,cis-9,12,15-Octadecatrienoic acid; (9Z,12Z,15Z)-9,12,15-Octadecatrienoic acid; "ALA"; 18:3; n-3) acids, formerly known as vitamin F (Cunnane S C. Progress in Lipid Research 2003; 42:544-568). LA, by further enzymatic desaturation and elongation, is converted into higher n-6 PUFAs such as arachidonic (AA; 20:4; n-6) acid; whereas ALA gives rise to a higher n-3 series, including, but not limited to, eicosapentaenoic acid (EPA; 20:5; n-3) and docosahexaenoic (DHA; 22:6; n-3) acid. Because of the essential nature of certain PUFAs or PUFA precursors, there are many known instances of their deficiency and these are often linked to medical conditions. Furthermore, many PUFA supplements are available over-the-counter, with proven efficiency against certain ailments.

PUFAs endow mitochondrial membranes with appropriate fluidity necessary for optimal oxidative phosphorylation performance. PUFAs also play an important role in initiation and propagation of the oxidative stress. PUFAs react with ROS through a chain reaction that amplifies an original event (Sun M, Salomon R G, J. Am. Chem. Soc. 2004; 126:5699-5708). However, non-enzymatic formation of high levels of lipid hydroperoxides is known to result in several detrimental changes. Indeed, Coenzyme Q10 has been linked to increased PUFA toxicity via PUFA peroxidation and the toxicity of the resulting products (Do T Q et al, PNAS USA 1996; 93:7534-7539). Such oxidized products negatively affect the fluidity and permeability of their membranes; they lead to oxidation of membrane proteins; and they can be converted into a large number of highly reactive carbonyl compounds. The latter include reactive species such as acrolein, malonic dialdehyde, glyoxal, methylglyoxal, etc. (Negre-Salvayre A, et al. Brit. J. Pharmacol. 2008; 153:6-20).

Site-selective isotopic reinforcement of polyunsaturated fatty acids at their bis-allylic sites has been identified as a unique approach in preventing oxidative damage in these molecules, which had been linked to neuronal and retinal diseases, atherosclerosis, and aging. Typical methods for preparation of site-selectively deuterated PUFAs require rather long, laborious, and expensive syntheses and sometimes produce unfavored side products. Smarun et al., J. Org. Chem. 2017, 82, 13115-13120. There exits a need to develop efficient catalytic processes for site-specific deuteration of PUFAs and analogous poly-alkenes.

SUMMARY

Some embodiments of the present disclosure relate to a method of for isotopic modification of a polyunsaturated lipid, comprising:

reacting the polyunsaturated lipid with an isotope-containing agent in a presence of a transition metal catalyst to obtain an isotopically modified polyunsaturated lipid having an isotope at one or more bis-allylic positions, wherein the isotope-containing agent comprises at least one isotope selected from the group consisting of deuterium, tritium, and a combinations thereof; and wherein the transition metal catalyst has a structure of Formula (I) or (II):

$$[ML^1(L^2)_m(L^3)_n]_p Q_k \qquad (I)$$

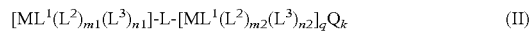

$$[ML^1(L^2)_{m1}(L^3)_{n1}]\text{-L-}[ML^1(L^2)_{m2}(L^3)_{n2}]_q Q_k \qquad (II)$$

wherein:

M is selected from the group consisting of rhodium, iridium, and ruthenium;

$L^1$ is $C_3$-$C_{10}$ cycloalkenyl, $C_4$-$C_{10}$ cycloalkynyl, $C_6$-$C_{10}$ aryl, 5 to 10 membered heteroaryl, or 3 to 10 membered heterocyclyl, wherein $L^1$ is optionally unsubstituted with one or more $R^4$;

each $L^2$ is independently selected from the group consisting of imine, carbene, carbonyl, alkene, alkyne, nitrile, isonitrile, acetonitrile, ether, thioether, phosphine, pyridine, optionally substituted $C_3$-$C_{10}$ cycloalkenyl, optionally substituted $C_4$-$C_{10}$ cycloalkynyl, optionally substituted $C_6$-$C_{10}$ aryl, optionally substituted 5 to 10 membered heteroaryl, or optionally substituted 3 to 10 membered heterocyclyl;

each $L^3$ is independently $C_1$-$C_6$ alkyl, $NR^1R^2$ or $C_1$-$C_6$ alkoxy;

each $R^1$ and $R^2$ is independently H, optionally substituted $C_1$-$C_6$ alkyl, optionally substituted $C_3$-$C_{10}$ cycloalkyl, optionally substituted $C_3$-$C_{10}$ cycloalkenyl, optionally substituted $C_4$-$C_{10}$ cycloalkynyl, optionally substituted $C_6$-$C_{10}$ aryl, optionally substituted 5 to 10 membered heteroaryl, or optionally substituted 3 to 10 membered heterocyclyl;

each $R^A$ is independently hydroxyl, halogen, cyano, nitro, optionally substituted $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, or optionally substituted amino;

L is a $C_1$-$C_6$ alkylene, $C_2$-$C_6$ alkenylene or $C_2$-$C_6$ alkynylene linker;

each of m, m1, m2, n, n1 and n2 is independently an integer of 1, 2 or 3;

each of p and q is independently an integer of 1, 2, 3 or 4;

Q is an anion; and k is 0, 1 or 2.

In some embodiments of the method, M is ruthenium. In some embodiments, the polyunsaturated lipid is a fatty acid (PUFA), a fatty acid ester, a fatty acid thioester, a fatty acid amide, and a phospholipid containing a fatty acid moiety.

Some embodiments of the present disclosure relate to a composition comprising one or more isotopically modified polyunsaturated lipids having an isotope predominantly at one or more bis-allylic positions, wherein the isotopically modified polyunsaturated lipids are prepared by a method described herein.

DETAILED DESCRIPTION

Embodiments of the present disclosure relate to processes of preparing isotopically polyunsaturated lipid(s) using a transition metal catalyzed reaction. The polyunsaturated lipid may be a fatty acid (PUFA), a fatty acid ester, a fatty acid thioester, a fatty acid amide, or a phospholipid containing a fatty acid moiety. In some embodiments, the processes provide deuterated polyunsaturated lipid or deuterated polyunsaturated lipid mixtures. In some embodiments, the methods described herein result in site-specific deuteration of polyunsaturated lipid, wherein the deuteration occurs at both bis-allylic positions and mono-allylic positions. In some further embodiments, the method may result in site-specific deuteration occurring predominantly or exclusively at the bis-allylic positions.

Definition

The section headings used herein are for organizational purposes only and are not to be construed as limiting the subject matter described.

Unless defined otherwise, all technical and scientific terms used herein have the same meaning as is commonly understood by one of ordinary skill in the art. The use of the term "including" as well as other forms, such as "include", "includes," and "included," is not limiting. The use of the term "having" as well as other forms, such as "have", "has," and "had," is not limiting. As used in this specification, whether in a transitional phrase or in the body of the claim, the terms "comprise(s)" and "comprising" are to be interpreted as having an open-ended meaning. That is, the above terms are to be interpreted synonymously with the phrases "having at least" or "including at least." For example, when used in the context of a process, the term "comprising" means that the process includes at least the recited steps, but may include additional steps. When used in the context of a compound, composition, formulation, or device, the term "comprising" means that the compound, composition, formulation, or device includes at least the recited features or components, but may also include additional features or components.

The term "about" as used herein, refers to a quantity, value, number, percentage, amount, or weight that varies from the reference quantity, value, number, percentage, amount, or weight by a variance considered acceptable by one of ordinary skill in the art for that type of quantity, value, number, percentage, amount, or weight. In various embodiments, the term "about" refers to a variance of 20%, 15%, 10%, 9%, 8%, 7%, 6%, 5%, 4%, 3%, 2% or 1% relative to the reference quantity, value, number, percentage, amount, or weight.

As used herein, the "bis-allylic" position refers to the methylene group of 1,4-diene systems of the polyunsaturated lipid described herein (e.g., the Y substitution positions of the polyunsaturated lipid of Formula (I)). As used herein, the "mono-allylic" position refers to the methylene group adjacent to only one double bond but is not the bis-allylic position (e.g., the X substitution positions of the polyunsaturated lipid of Formula (I)). It is further exemplified in the following structure:

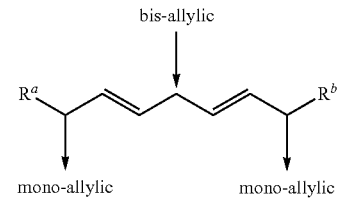

The term "polyunsaturated lipid," as used herein, refers to a lipid that contains two or more unsaturated bonds, such as double or triple bonds, in its hydrocarbon chain. The polyunsaturated lipid here can be a polyunsaturated fatty acid, polyunsaturated fatty acid ester, polyunsaturated fatty acid thioester, polyunsaturated fatty acid amide, polyunsaturated fatty acid phosphate, or a phospholipid containing the polyunsaturated fatty acid residue.

In some aspects, an isotopically modified PUFA molecule may contain one deuterium atom, such as when one of the two hydrogens in a methylene group is replaced by deuterium, and thus may be referred to as a "D1" PUFA. Similarly, an isotopically modified PUFA molecule may contain two, three, four, five, six, seven, eight, nine, ten, eleven, twelve, thirteen or fourteen deuterium atoms, may be referred to as a "D2", "D3", "D4", "D5", "D6", "D7", "D8", "D9", "D10", "D11", "D12", "D13" or "D14" PUFA, respectively.

As used herein, "$C_a$ to $C_b$" in which "a" and "b" are integers refer to the number of carbon atoms in an alkyl, alkenyl or alkynyl group, or the number of carbon atoms in the ring of a cycloalkyl, aryl, heteroaryl or heterocyclyl group. That is, the alkyl, alkenyl, alkynyl, ring of the cycloalkyl, ring of the aryl, ring of the heteroaryl or ring of the heterocyclyl can contain from "a" to "b", inclusive, carbon atoms. Thus, for example, a "$C_1$ to $C_4$ alkyl" group refers to all alkyl groups having from 1 to 4 carbons.

As used herein, "alkyl" refers to a straight or branched hydrocarbon chain that comprises a fully saturated (no double or triple bonds) hydrocarbon group of 1 to 20 carbon atoms, or 1 to 10 carbon atoms, or 1 to 6 carbon atoms.

As used herein, "alkenyl" refers to an alkyl group that contains in the straight or branched hydrocarbon chain one or more double bonds. The alkenyl group may have 2 to 20 carbon atoms or 8 to 18 carbons.

As used herein, cycloalkylnyl refers a hydrocarbon ring system having 6 to 20 carbon atoms, or 8 to 20 carbon atoms and having 1 to 3 alkynyl groups contained within the ring system.

As used herein, "alkynyl" refers to an alkynyl group of 2 to 20 carbon atoms, 2 to 10 carbon atoms, or 2 to 6 carbon atoms.

As used herein, "cycloalkyl" refers to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s) or 3 to 8 atoms in the ring(s). A cycloalkyl group may be unsubstituted or substituted. Typical cycloalkyl groups include, but are in no way limited to, cyclopropyl, cyclobutyl, cyclopentyl, cyclohexyl, cycloheptyl, and cyclooctyl. A cycloalkyl group may be unsubstituted or substituted.

As used herein, "aryl" refers to a carbocyclic (all carbon) monocyclic or multicyclic aromatic ring system of 6 to 14 ring atoms (including, e.g., fused, bridged, or spiro ring systems where two carbocyclic rings share a chemical bond, e.g., one or more aryl rings with one or more aryl or non-aryl rings). The number of carbon atoms in an aryl group can vary. For example, the aryl group can be a $C_6$-$C_{14}$ aryl group, a $C_6$-$C^{10}$ aryl group, or a $C_6$ aryl group. Examples of aryl groups include, but are not limited to, benzene, naphthalene, and azulene. An aryl group may be substituted or unsubstituted.

As used herein, "heteroaryl" refers to a monocyclic or multicyclic aromatic ring system (a ring system with fully delocalized pi-electron system) that contain(s) one or more heteroatoms (for example, 1, 2 or 3 heteroatoms), that is, an element other than carbon, including but not limited to, nitrogen, oxygen and sulfur. The number of atoms in the ring(s) of a heteroaryl group can vary. For example, the heteroaryl group can contain 5 to 10 atoms in the ring(s), 6 to 10 atoms. Examples of heteroaryl rings include, but are not limited to, furan, furazan, thiophene, benzothiophene, phthalazine, pyrrole, oxazole, benzoxazole, 1,2,3-oxadiazole, 1,2,4-oxadiazole, thiazole, 1,2,3-thiadiazole, 1,2,4-thiadiazole, benzothiazole, imidazole, benzimidazole, indole, indazole, pyrazole, benzopyrazole, isoxazole, benzoisoxazole, isothiazole, triazole, benzotriazole, thiadiazole, tetrazole, pyridine, pyridazine, pyrimidine, pyrazine, purine, pteridine, quinoline, isoquinoline, quinazoline, quinoxaline, cinnoline and triazineA heteroaryl group may be substituted or unsubstituted.

As used herein, "heterocyclyl" refers to three-, four-, five-, six-, seven-, eight-, nine- and ten-membered monocyclic, bicyclic and tricyclic ring system wherein carbon atoms together with from 1 to 5 heteroatoms constitute said ring system. A heterocycle may optionally contain one or more unsaturated bonds provided the system is not aromatic. The heteroatom(s) is an element other than carbon including, but not limited to, oxygen, sulfur and nitrogen. Heterocyclyl groups may be unsubstituted or substituted. Examples of such "heterocyclyl" groups include but are not limited to, aziridine, oxirane, thiirane, azetidine, oxetane, 1,3-dioxin, 1,3-dioxane, 1,4-dioxane, 1,2-dioxolane, 1,3-dioxolane, 1,4-dioxolane, 1,3-oxathiane, 1,4-oxathiin, 1,3-oxathiolane, 1,3-dithiole, 1,3-dithiolane, 1,4-oxathiane, tetrahydro-1,4-thiazine, 2H-1,2-oxazine, maleimide, succinimide, barbituric acid, thiobarbituric acid, dioxopiperazine, hydantoin, dihydrouracil, trioxane, hexahydro-1,3,5-triazine, imidazoline, imidazolidine, isoxazoline, isoxazolidine, oxazoline, oxazolidine, oxazolidinone, thiazoline, thiazolidine, morpholine, oxirane, piperidine N-oxide, piperidine, piperazine, pyrrolidine, azepane, pyrrolidone, pyrrolidione, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone and their benzofused analogs (e.g., benzimidazolidinone, tetrahydroquinoline and/or 3,4-methylenedioxyphenyl). Examples of spiro heterocyclyl groups include 2-azaspiro [3.3] heptane, 2-oxaspiro [3.3] heptane, 2-oxa-6-azaspiro [3.3] heptane, 2,6-diazaspiro [3.] heptane, 2-oxaspiro [3.4] octane and 2-azaspiro [3.4] octane.

As used herein, a substituted group is derived from the unsubstituted parent group in which there has been an exchange of one or more hydrogen atoms for another atom or group. Unless otherwise indicated, when a group is deemed to be "substituted," it is meant that the group is substituted with one or more substituents independently selected from $C_1$-$C_6$ alkyl, $C_1$-$C_6$ alkenyl, $C_1$-$C_6$ alkynyl, $C_1$-$C_6$ heteroalkyl, $C_3$-$C_7$ carbocyclyl (optionally substituted with halo, $C_1$-$C_6$ alkyl, $C_1$-$C_6$ alkoxy, v haloalkyl, and $C_1$-$C_6$ haloalkoxy), $C_3$-$C_7$-carbocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heterocyclyl-$C_1$-$C_6$-alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl (optionally substituted with halo, $C_1$-$C_6$ alkyl, $C_1$-$C_6$ alkoxy, $C_1$-$C_6$ haloalkyl, and $C_1$-$C_6$ haloalkoxy), aryl($C_1$-$C_6$)alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl (optionally substituted with halo, $C_1$-$C_6$ alkyl, $C_1$-$C_6$ alkoxy, $C_1$-$C_6$ haloalkyl, and $C_1$-$C_6$ haloalkoxy), 5-10 membered heteroaryl($C_1$-$C_6$) alkyl (optionally substituted with halo, $C_1$-$C_6$ alkyl, $C_1$-$C_6$ alkoxy, $C_1$-$C_6$ haloalkyl, and $C_1$-$C_6$ haloalkoxy), halo, cyano, hydroxy, $C_1$-$C_6$ alkoxy, $C_1$-$C_6$ alkoxy ($C_1$-$C_6$)alkyl (i.e., ether), aryloxy, sulfhydryl (mercapto), halo($C_1$-$C_6$) alkyl (e.g., —$CF_3$), halo($C_1$-$C_6$)alkoxy (e.g., —$OCF_3$), $C_1$-$C_6$ alkylthio, arylthio, amino, amino($C_1$-$C_6$)alkyl, nitro, O-carbamyl, N-carbamyl, O-thiocarbamyl, N-thiocarbamyl, C-amido, N-amido, S-sulfonamido, N-sulfonamido, C-carboxy, O-carboxy, acyl, cyanato, isocyanato, thiocyanato, isothiocyanato, sulfinyl, sulfonyl, and oxo (=O). Wherever a group is described as "substituted" that group can be substituted with the above substituents. In some embodiments, substituted group(s) is (are) substituted with one or more substituent(s) individually and independently selected from $C_1$-$C_4$ alkyl, $C_1$-$C_4$ alkoxy, $C_1$-$C_4$ haloalkyl, $C_1$-$C_4$ halalkoxy, amino, hydroxy, and halogen.

As used herein, the term "thioester" refers to a structure in which a carboxylic acid and a thiol group are linked by an ester linkage or where a carbonyl carbon forms a covalent bond with a sulfur atom —C(=O)S$R^A$, wherein $R^A$ may include hydrogen, optionally substituted $C_{1-30}$ alkyl (branched or straight), optionally substituted $C_{2-30}$ alkenyl (branched or straight), optionally substituted $C_{2-30}$ alknynyl (branched or straight), or optionally substituted ring structure such as $C_{6-10}$ aryl, heteroaryl, carbocyclyl, cycloalkyl or heterocyclyl. "Polyunsaturated fatty acid thioester" refers to a structure P—C(=O)SR$^A$, wherein P is a polyunsaturated fatty acid described herein.

As used herein, the term "amide" refers to compounds or moieties of the structure —C(O)NR$^A$R$^B$ and R$^A$ and R$^B$ can independently be hydrogen, optionally substituted $C_{1-30}$ alkyl (branched or straight), optionally substituted $C_{2-30}$ alkenyl (branched or straight), optionally substituted $C_{2-30}$ alknynyl (branched or straight), or optionally substituted ring structure such as $C_{6-10}$ aryl, heteroaryl, carbocyclyl, cycloalkyl or heterocyclyl. "Polyunsaturated fatty acid amide" refers to a structure a structure P—C(=O)NR$^A$R$^B$, wherein P is a polyunsaturated fatty acid described herein.

As used herein, the term "salt" as used herein is a broad term, and is to be given its ordinary and customary meaning to a person of ordinary skill in the art (and is not to be limited to a special or customized meaning).

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as —CH$_2$—, —CH$_2$CH$_2$—, —CH$_2$CH(CH$_3$)CH$_2$—, and the like. Other radical naming conventions clearly indicate that the radical is a di-radical such as "alkylene" or "alkenylene."

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure, enantiomerically enriched, or may be stereoisomeric mixtures, and include all diastereomeric, and enantiomeric forms. In addition it is understood that, in any compound described herein having one or more double bond(s) generating geometrical isomers that can be defined as E or Z, each double bond may independently be E or Z a mixture thereof. Stereoisomers are obtained, if desired, by methods such as, stereoselective synthesis and/or the separation of stereoisomers by chiral chromatographic columns.

Likewise, it is understood that, in any compound described, all tautomeric forms are also intended to be included.

As used herein, "predominantly" refers to about 50% or greater. In one embodiment, predominantly refers to greater than about 50%, 55%, 60%, 65%, 70%, 75%, 80%, 85%, 90%, 95%, 96%, 97%, 98%, 99%, or 100%.

Unless otherwise stated, when a position is designated specifically as "H" or "hydrogen", the position is understood to have hydrogen at its natural abundance isotopic composition. Unless otherwise stated, when a position is designated specifically as "D" or "deuterium", the position has deuterium at an abundance that is at least 3206 times of the natural abundance of deuterium, which is 0.0156% (i.e., at least 50% deuterium incorporation). More specifically, the position may have deuterium at an abundance that is at least 3500 times (54.6% deuterium incorporation), 4000 times (62.4% deuterium incorporation), 4500 times (70.2% deuterium incorporation), 5000 times (78% deuterium incorporation), 5500 times (85.8% deuterium incorporation), 6000 times (93.6% deuterium incorporation), 6090 times (95% deuterium incorporation), 6250 times (97.5% deuterium incorporation), 6346 times (99% deuterium incorporation), or 6378 times (99.5% deuterium incorporation) of the natural abundance of deuterium.

As used herein, the term "isotope-containing agent" refers to a compound containing deuterium or tritium atoms at an abundance that is significantly higher than the natural abundance of each of the atoms. For deuterium-containing agent, it contains at least 3206 times of the natural abundance of deuterium, (i.e., at least 50% deuterium incorporation). In some further embodiments, the isotope-containing agent has at least 4000, 4500, 5000, 5500, 6000, 6090, 6250, 6346 or 6378 times of the natural abundance of deuterium.

As used herein, the term "isotopic purity" of an isotope-containing agent refers to the percentage of molecules containing heave atoms (e.g., D or T) relative to the total number of molecules including molecules with no heavy atoms. For example, when the isotope-containing agent is heavy water (i.e., D$_2$O) with 95% isotopic purity, it means in every 100 water molecules, there are 95 D$_2$O molecule and 5 H$_2$O molecule. In some instances, the isotopic purity of an isotope-containing agent may be at least 50%, 65%, 60%, 65%, 70%, 75%, 80%, 85%, 90%, 95%, or 99%.

Methods of Site-Specific Isotopic Modification

Conventional deuteration of molecules containing one alkene using the transition metal as a catalyst often have problems, including that predominantly vinylic positions (hydrogen atom connected to a doubly bonded carbon atom) are selectively deuterated. Many alkenes contain movement-restricted double bonds. Limited examples of linear (movement-unrestricted) alkenes yielded positional isomers, and cis-to-trans isomerisation always accompanied the deuteration process and lack of any reports on H/D exchange involving polyunsaturated alkenes.

Selective and efficient deuteration of various polyalkenes (including PUFAs) at the bis-allylic sites by a Ru-based complex (such as [Ru(Cp)(ACN)$_3$]±PF6$^-$ (Cp=cyclopentadiene; CAN=acetonitrile) using a deuterium source D$_2$O is described in U.S. Pub. No. WO 2017/091279. This Ru catalyst was capable of performing H/D exchange (deuteration) at the bis-allylic positions of linolenic acid (LNN), arachidonic acid (ARA), eicosapentaenoic acid (EPA) and docosahexaenoic acid (DHA) or ester thereof with at least 95% of deuteration efficiency. In addition, no more than about 30% of deuteration occurs at the mono-allylic positions of these polyunsaturated fatty acid or esters thereof. However, when linoleic acid (LIN) or an alkyl ester (e.g., ethyl ester) was subjected to the catalytic procedure using this Ru catalyst, only mono-allylic sites were deuterated to about 95% efficiency.

Without being bound by any theory, it is believed that reason for LIN being an exception with respect to deuteration selectivity lies in the proposed mechanism in which a PUFA binds to the ruthenium centre with two double bonds while D$_2$O molecule occupies the remaining coordination site (structure A, Scheme 1). This structure is believed to activate both the heavy water molecule (making it more acidic) as well as both the mono- and bis-allylic sites of the bound PUFA. In the next step, the H/D exchange occurs, through the help of one or more additional D$_2$O molecules (structure B, Scheme 1) but at the CH$_2$ site closer to the bound D$_2$O molecule. This CH$_2$ site could be either mono- or bis-allylic for LNN, ARA, EPA and DHA, but it appears that bis-allylic sites are favoured over the mono-allylic sites with respect to the deuteration process for these PUFAs. Nevertheless, in the case of LIN there is only one bis-allylic site, which is spatially far away from the bound D$_2$O molecule (structure A, Scheme 1). Hence, this site may not be involved in the overall deuteration process. Since only the mono-allylic sites of LIN are spatially close to the bound D$_2$O, these mono-allylic sites are indeed deuterated.

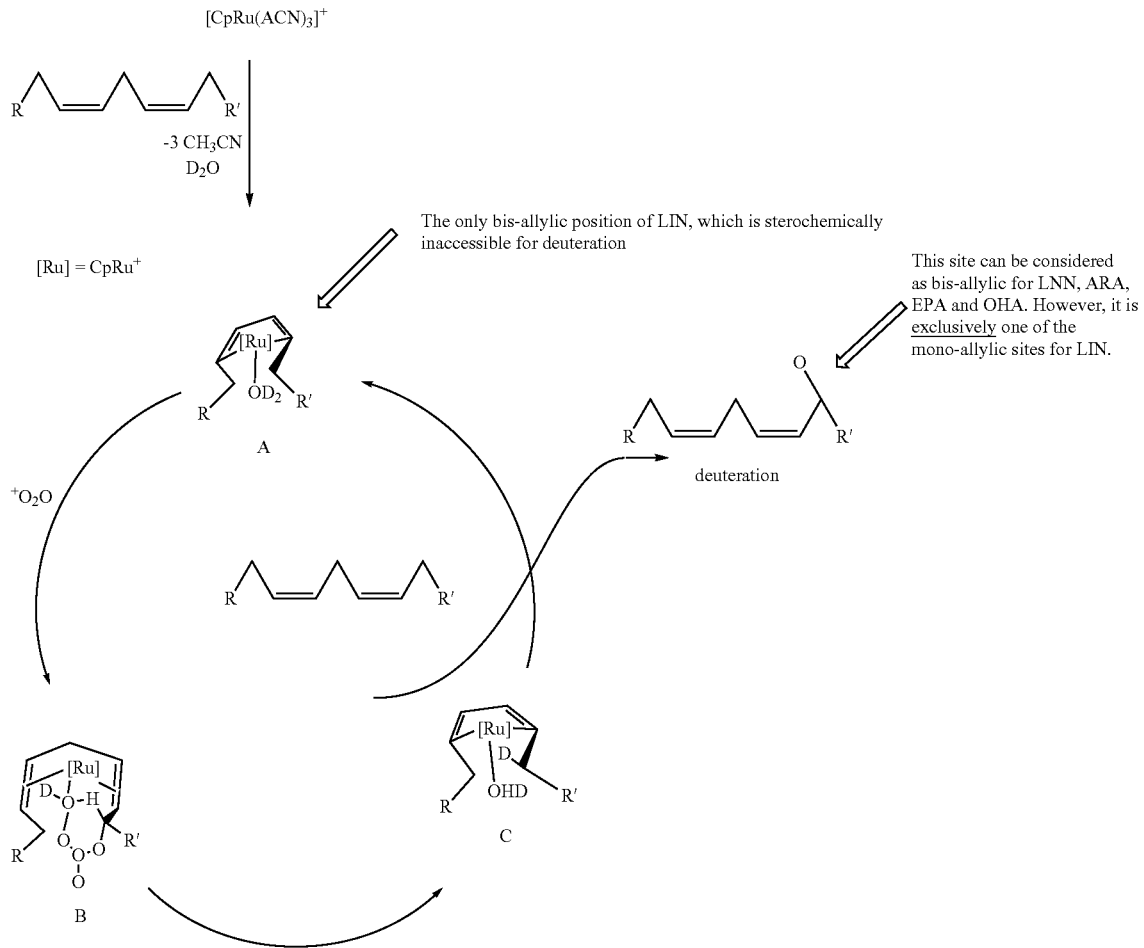

Scheme 1. Proposed Mechanism of Ru-Catalyzed H/D Exchange Process Involving PUFA Based on this proposed mechanism, it is believed that in order to deuterated LIN predominantly or exclusively at the bis-allylic position the following factors are important: (1) LIN needs to coordinate to the transition metal (e.g., ruthenium) in the similar fashion as depicted in structures A, B or C in Scheme 1; (2) the isotope-containing agent (e.g., D$_2$O) binding site to ruthenium needs to be occupied/blocked by another molecule in order to avoid mono-allylic deuteration; and (3) D$_2$O that is present in solution may need to be acidified. It should be also noted that the presence of the cylopentadienyl ligand (Cp), or presumably some other ring-type ligand (e.g. benzene), may be important for the overall deuteration. Therefore, in order to achieve an optimal outcome several different approaches are proposed as described in details below.

Some embodiment of the present disclosure relate to a method of for isotopic modification of a polyunsaturated lipid, comprising:

reacting the polyunsaturated lipid with an isotope-containing agent in a presence of a transition metal catalyst to obtain an isotopically modified polyunsaturated lipid having an isotope at one or more bis-allylic positions, wherein the isotope-containing agent comprises at least one isotope selected from the group consisting of deuterium, tritium, and a combinations thereof; and wherein the transition metal catalyst has a structure of Formula (I) or (II):

$$[ML^1(L^2)_m(L^3)_n]_pQ_k \qquad (I)$$

$$[ML^1(L^2)_{m1}(L^3)_{n1}]\text{-L-}[ML^1(L^2)_{m2}(L^3)_{n2}]_qQ_k \qquad (II)$$

wherein:

M is selected from the group consisting of rhodium, iridium, and ruthenium;

L$^1$ is C$_3$-C$_{10}$ cycloalkenyl, C$_4$-C$_{10}$ cycloalkynyl, C$_6$-C$_{10}$ aryl, 5 to 10 membered heteroaryl, or 3 to 10 membered heterocyclyl, wherein L$^1$ is optionally unsubstituted with one or more R$^4$;

each L$^2$ is independently selected from the group consisting of imine, carbene, carbonyl, alkene, alkyne, nitrile, isonitrile, acetonitrile, ether, thioether, phosphine, pyridine, optionally substituted C$_3$-C$_{10}$ cycloalkenyl, optionally substituted C$_4$-C$_{10}$ cycloalkynyl, optionally substituted C$_6$-C$_{10}$ aryl, optionally substituted 5 to 10 membered heteroaryl, or optionally substituted 3 to 10 membered heterocyclyl;

each L$^3$ is independently C$_1$-C$_6$ alkyl, NR$^1$R$^2$ or C$_1$-C$_6$ alkoxy;

each $R^1$ and $R^2$ is independently H, optionally substituted $C_1$-$C_6$ alkyl, optionally substituted $C_3$-$C_{10}$ cycloalkyl, optionally substituted $C_3$-$C_{10}$ cycloalkenyl, optionally substituted $C_4$-$C_{10}$ cycloalkynyl, optionally substituted $C_6$-$C_{10}$ aryl, optionally substituted 5 to 10 membered heteroaryl, or optionally substituted 3 to 10 membered heterocyclyl;

each $R^A$ is independently hydroxyl, halogen, cyano, nitro, optionally substituted $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, or optionally substituted amino;

L is a $C_1$-$C_6$ alkylene, $C_2$-$C_6$ alkenylene or $C_2$-$C_6$ alkynylene linker;

each of m, m1, m2, n, n1 and n2 is independently an integer of 1, 2 or 3;

each of p and q is independently an integer of 1, 2, 3 or 4;

Q is an anion; and k is 0, 1 or 2.

In some embodiments of the transition metal catalyst of Formula (I) or (II), the transition metal catalyst is a ruthenium (Ru) catalyst.

In some embodiments, the blocking of the isotope-containing agent (e.g., $D_2O$) coordination site may be achieved by using a ligand that will be (a) sterically small so it does not interfere with polyunsaturated lipid (e.g., PUFA) binding and (b) strongly bound to the transition metal (e.g., ruthenium) such that it is not displaced by PUFA binding. To achieve these purposes, ligand such as alkyl, amino or alkoxy groups may be used. An embodiment of preparing such catalyst is illustrated in Scheme 2 below.

Scheme 2. Proposed Synthesis of Catalyst D and Proposed Formation of Active Species (D')

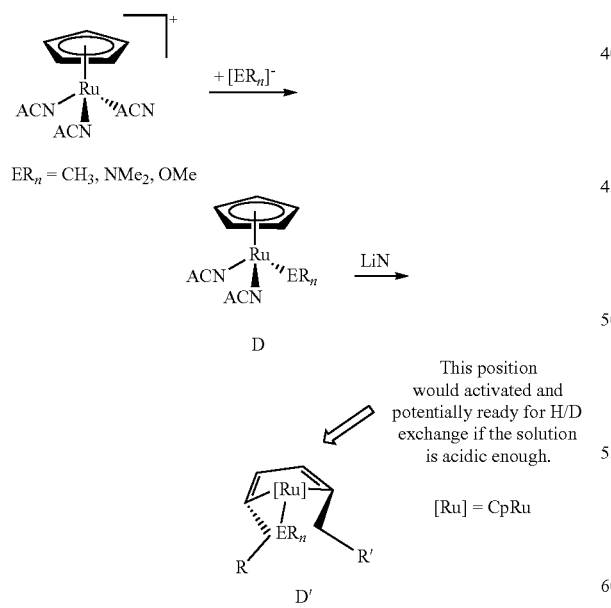

Catalyst D would block the deuteration at the mono-allylic positions once LIN is added (i.e. formation of D') while at the same time keeping the bis-allylic position activated and ready for deuteration if acidity of the medium is adequate. However, compound D and D' are neutral compounds. There is some possibility that such neutral form might affect their solubility and/or catalytic capabilities in the overall reaction medium.

If a neutral transition metal catalyst (e.g., Catalyst D) is not compatible with the reaction mixture and/or underperform catalytically, a cationic analog of the catalyst may be used. In some embodiments, a benzene ligand may be used to replace cyclopentadiene (Cp) as this ligand switch would keep the overall charge of the complex positive. An embodiment of the synthesis of such catalyst is illustrated in Scheme 3 below.

Scheme 3. Proposed Synthesis of a Cationic Ru Catalyst

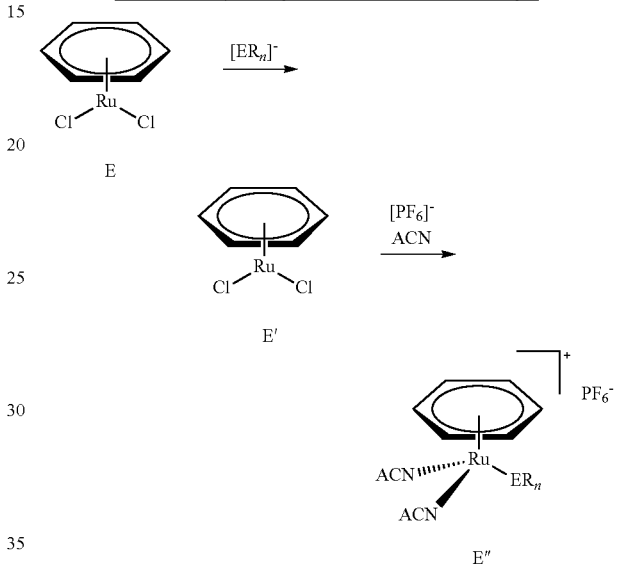

In some embodiments, changing the acidity of the catalyst may improve the reaction efficiency. In some such embodiment, a Lewis acid may be used to tether to a portion of the catalyst (e.g., tethered to a ligand of the catalyst). The tethering process could potentially lower the amount of the Lewis acid needed to acidify the solution as this tethered fragment would be positioned in a close proximity to the activated (i.e. Ru bound) LIN. Embodiments of such catalyst (Catalysts F and F') are illustrated below.

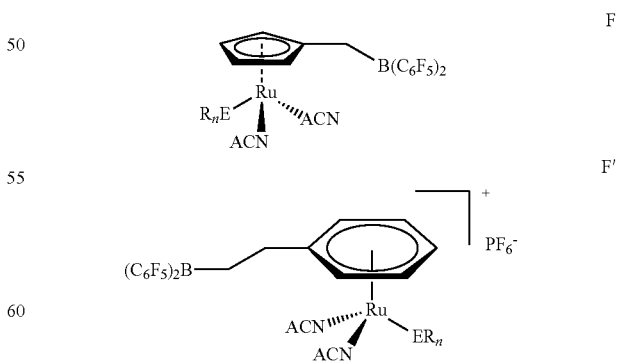

Alternatively, a dinuclear catalytic system of Formula (II) may also be used in the method described herein. An embodiment of the deuteration of linoleic acid in the presence of heavy water using a dinuclear Ru catalyst is illustrated in Scheme 4. In this example, one of the Ru centers (the left one) would have two sites blocked with ligands (i.e., ERn) allowing only D$_2$O to bind while the other one (right) would have only one site blocked allowing LIN to bind.

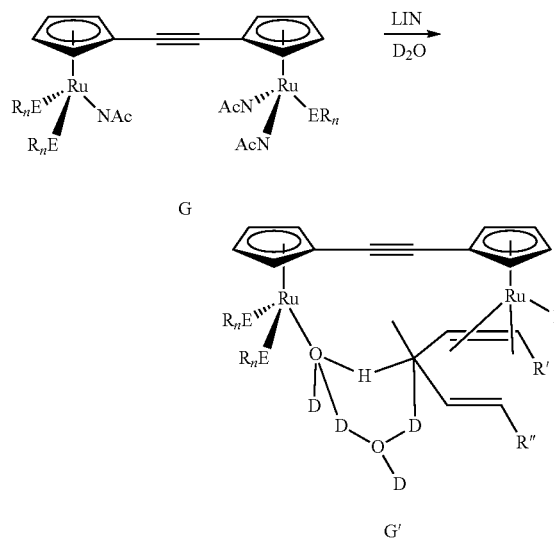

In some embodiments of the transition metal catalyst of Formula (I) or (II), L$^1$ is C$_3$-C$_{10}$ cycloalkenyl or C$_6$-C$_{10}$ aryl, each optionally substituted with one or more R$^4$. In one embodiment, L$^1$ is an unsubstituted cyclopentadienyl (Cp). In another embodiment, L$^1$ is a substituted cyclopentadienyl with one R$^4$. In another embodiment, L$^1$ is an unsubstituted benzene. In another embodiment, L$^1$ is a substituted benzene with one R$^4$. In some further embodiments, L$^1$ is C$_3$-C$_{10}$ cycloalkenyl or C$_6$-C$_{10}$ aryl, each substituted with one or more R$^4$. In some such embodiments, R$^4$ is C$_1$-C$_6$ alkyl substituted with a Lewis acid. In some further embodiments, R$^4$ is C$_1$-C$_6$ alkyl substituted with B(R$^3$)$_2$, and wherein each R$^3$ is independently H, halogen, C$_1$-C$_6$ alkyl, C$_1$-C$_6$ haloalkyl, or optionally substituted C$_6$-C$_{10}$ aryl. In some further embodiments, R$^4$ is C$_1$-C$_6$ alkyl substituted with B(C$_6$H$_5$)$_2$.

In some embodiments of the transition metal catalyst of Formula (I) or (II), each L$^2$ is independently nitrile, isonitrile, acetonitrile, or a phosphine. In some embodiments, each L$^2$ is acetonitrile (CH$_3$CN). In some embodiments, at least one L$^2$ is a phosphine of the structure P(R$^4$)$_3$, wherein each R$^4$ is independently C$_{1-6}$ alkyl, C$_{3-8}$ cycloalkyl, 4-10 membered heteroaryl, C$_{6-10}$ aryl, each optionally substituted. In some further embodiments, P(R$^4$)$_3$ is P(t-Bu)$_2$(C$_6$H$_5$). In some embodiments, P(R$^4$)$_3$ is 4-(tert-butyl)-2-(diisopropylphosphaneyl)-1H-imidazole. In some embodiments, each L$^2$ is independently acetonitrile or optionally substituted cyclopentadienyl.

In some embodiments of the transition metal catalyst of Formula (I) or (II), each L$^3$ is independently is methyl, methoxy, or N(CH$_3$)$_2$.

In some embodiments of the transition metal catalyst of Formula (I), m is 1 or 2. In some embodiments, n is 2 or 1. In some further embodiments, m+n=3. In some embodiments of the transition metal catalyst of Formula (II), each of m1 and m2 is 1 or 2. In some embodiments, each of n1 and n2 is 2 or 1. In some further embodiments, m1+n1=3 and/or m2+n2=3.

In some embodiments of the transition metal catalyst of Formula (I) or (II), k is 0. In some other embodiments, k is 1. In some such embodiments, Q is an anion with a single negative charge, such as is PF$_6^-$, Cl$^-$, F$^-$, I$^-$, Br$^-$, NO$_3^-$, ClO$_4^-$, BF$_4^-$, B(C$_1$-C$_4$ alkyl)$_4^-$, Al(C$_1$-C$_4$ alkyl)$_4^-$, B(C$_6$-C$_{10}$ aryl)$_4^-$, Al(C$_6$-C$_{10}$ aryl)$_4^-$, or a carborane anion. In one embodiments, Q is PF$_6^-$. In such embodiments, p and/or q is 1. In some other embodiments, Q is an anion with a double negative charge, e.g., SO$_4^{2-}$. In such embodiments, p or q is 2.

Additional ligands that may be use in the transition metal catalyst described herein include amine ligands. Amine ligands can be monodentate or multidentate and include monoamine, diamine, and triamine moieties. Monoamines can have the formula of N(Rb)2, and exemplary monoamines include but are not limited to dialkylmonoamines (such as di-ra-butylamine, or DBA) and trialkylmonoamines (such as N,N-dimethylbutylamine, or DMBA). Suitable dialkylmonoamines include dimethylamine, di-ra-propylamine, di-ra-butylamine, di-sec-butyl amine, di-tert-butylamine, dipentylamine, dihexylamine, dioctylamine, didecylamine, dibenzylamine, methylethylamine, methylbutylamine, dicyclohexylamine, N-phenylethanolamine, N-(p-methyl) phenylethanolamine, N-(2,6-dimethyl) phenylethanolamine, N-(p-chloro)phenylethanolamine, N-ethylaniline, N-butyl aniline, N-methyl-2-methylaniline, N-methyl-2,6-dimethylaniline, diphenylamine, and the like, and combinations thereof. Suitable trialkylmonoamines include trimethylamine, triethylamine, tripropylamine, tributylamine, butyldimethylamine, phenyldiethylamine, and the like, and combinations thereof. Diamines can have the formula (R$^b$)$_2$N—R$^a$—N(R$^b$)$_2$, and exemplary diamines can include alkylenediamines, such as N,N'-di-ieri-butylethylenediamine, or DBEDA. Triamine refers to an organic molecule having three amine moieties, including but not limited to diethylene triamine (DETA), guanidine HCl, tetramethyl guanidine, and the like. For both the monoamine and diamine formula, R$^a$ is a substituted or unsubstituted divalent residue; and each R$^b$ is independently hydrogen, C$_1$-C$_8$ alkyl, or C$_{6-10}$ aryl. In some examples, of the above formula, two or three aliphatic carbon atoms form the closest link between the two diamine nitrogen atoms. Specific alkylenediamine ligands include those in which R$^a$ is dimethylene (—CH$_2$CH$_2$—) or trimethylene (—CH$_2$CH$_2$CH$_2$—). R$^b$ can be independently hydrogen, methyl, propyl, isopropyl, butyl, or a C$_4$-C$_8$ alpha-tertiary alkyl group. In some embodiments, the diamine can be ethylenediamine. In some embodiments, the triamine can be diethylenetriamine.

The alkylenediamine ligands can be monodentate or multidentate and examples include N,N,N',N' tetramethylethylene diamine (TMED), N,N'-di-tert-butylethylenediamine (DBEDA), N,N,N',N'-tetramethyl-1,3-diaminopropane (TMPD), N-methyl-1,3-diaminopropane, N,N'-dimethyl-1,3-diaminopropane, N,N,N'-dimethyl-1,3-diaminopropane, N-ethyl-1,3-diaminopropane, N-methyl-1,4-diaminobutane, N,N'-trimethyl-1,4-diaminobutane, N,N,N'-trimethyl-1,4-diaminobutane, N,N,N',N'-tetramethyl-1,4-diaminobutane, N,N,N',N'-tetramethyl-1,5-diaminopentane, and combinations thereof. In some embodiments, the amine ligand is selected from di-ra-butylamine (DB A), N,N-dimethylbutylamine (DMB A), N,N'-di-tert-butylethylenediamine (DBEDA), and combinations thereof.

Additional ligands that may be use in the transition metal catalyst described herein include alkene ligands. Amine The alkene ligands described herein be monodentate or multidentate and include a molecule that has at least one non-aromatic carbon-carbon double bond and can include but are not limited to monoalkene and dialkene. Examples of the alkene ligand can include ethylene, propylene, butene, hexene, decene, butadiene, and the like.

The isonitrile ligands described herein is also called isocyanide, referring to a molecule having at least one —NC moiety and can be monodentate or multidentate and include but are not limited to monoisonitrile and diisonitrile ligands. Examples of monoisonitrile and diisonitrile include but are not limited to $C_{1-10}$ alkyl-NC and CN—R—NC and R is a $C_{1-10}$ alkylene, t-butyl-NC, methyl-NC, PhP(O)(OCH$_2$CH(t-Bu)NC)$_2$, PhP(O)(OCH$_2$CH(Bn)NC)$_2$ PhP(O)(OCH$_2$CH(i-Pr)NC)$_2$, PhP(O)(OCHCH$_3$CH(i-Pr)NC)$_2$, PhP(O)(OCH$_2$CH(CH$_3$)NC)$_2$. Additional isonitrile ligands can be found in Naik et al., *Chem. Commun.*, 2010, 46, 4475-4477, which is incorporated herein by reference in its entirety.

The nitrile ligands described herein refer to a molecule having at least one —CN moiety and can be monodentate or multidentate and include but are not limited to monoisonitrile and diisonitrile ligands. Examples of monoisonitrile and diisonitrile include but are not limited to C1_10 alkyl-CN and CN—R—CN and R is a $C_{1-10}$ alkylene, acetonitrile, 1,3,5-cyclohexanetricarbonitrile, propionitrile, butyronitrile, glutaronitrile, pivalonitrile, capronitrile, (CH$_2$)$_3$CN, (CH$_2$)$_4$CN, (CH$_2$)$_5$CN. Additional nitrile ligands can be found in Lee et al., Inorganic and *Nuclear Chemistry letters*, v10, 10 (October 1974) p. 895-898, which is incorporated herein by reference in its entirety.

The ether ligands described herein refer to a molecule having at least one R—O—R moiety wherein each R is independently an alkyl or aryl radical and can be monodentate or multidentate and include monoether, diether, and triether ligands. Examples of the monoether, diether, triether, and other suitable ether include but are not limited to dimethyl ether, diethyl ether, tetrahydrofuran, dioxane, dimethoxyethane, diethylene glycol dimethyl ether, polyethylene glycol, and anisole.

The thioether ligands described herein refer to a molecule having at least one R—S—R moiety a wherein each R is independently an alkyl or aryl radical and can be monodentate or multidentate and include monothioether, dithioether, and trithioether ligands. Examples of the monothioether, dithioether, and trithioether include but are not limited to dimethylsulfide and methyl phenyl sulfide.

The imine ligands described herein refer to a molecule having at least one carbon nitrogen double bond moiety and can be monodentate or multidentate and include monoimine, diimine, and triimine ligands. Examples of imine ligand include but are not limited to 1,2-ethanediimine, imidazolin-2-imine, 1,2-diketimine, dimethylglyoxime, o-phenylenediamine, 1,3-diketimines, and glyoxal-bis(mesitylimine).

The carbene ligands as described herein refers to compounds having at least one divalent carbon atom with only six electrons in its valence shell when not coordinated to a metal. This definition is not limited to metal-carbene complexes synthesized from carbenes, but is rather intended to address the orbital structure and electron distribution associated with the carbon atom that is bound to the metal. The definition recognizes that the "carbene" may not technically be divalent when bound to the metal, but it would be divalent if it were detached from the metal. Although many such compounds are synthesized by first synthesizing a carbene and then binding it to a metal, the definition is intended to encompass compounds synthesized by other methods that have a similar orbital structure and electron configuration. Lowry & Richardson, *Mechanism and Theory in Organic Chemistry* 256 (Harper & Row, 1976) defines "carbene" in a way that is consistent with the way the term is used herein.

The carbene ligands described herein can be monocarbene, dicarbene, and tricarbene. Examples of carbene ligands include but are not limited to 1,10-dimethyl-3,30-methylenediimidazolin-2,20-diylidene, 1,10-dimethyl-3,30-ethylenediimidazolin-2,20-diylidene, 1,10-dimethyl-3,30-propylenediimidazolin-2,20-diylidene, 1,10-dimethyl-3,30-methylenedibenzimidazolin-2,20-diylidene, 1,10-dimethyl-3,30-ethylenedibenzimidazolin-2,20-diylidene, 1,10-dimethyl-3.30-propylenediimidazolin-2,20-diylidene,

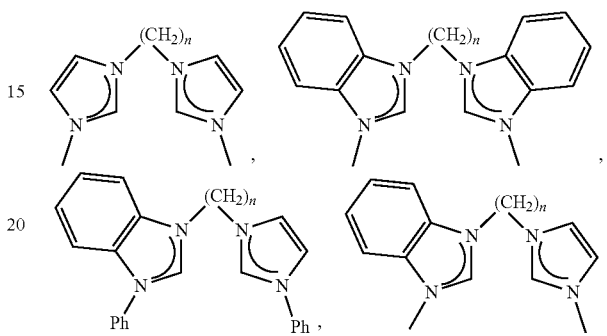

and n is 1, 2, or 3, and

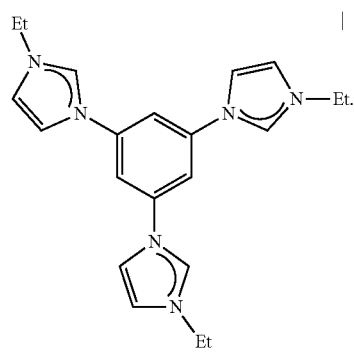 [SMILES: CCN1C=CN(c2cc(N3C=CN(CC)C3)cc(N3C=CN(CC)C3)c2)C1]

Additional carbene ligands can be found in Huynh et al, Journal of Organometallic Chemistry, v696, 21, (October 2011), p. 3369-33'75, and Malty et al., *Chem. Commun.*, 2013, 49, 1011-101, which are incorporated herein by reference in their entireties.

The pyridine ligands as described herein refer to a molecule having at least one pyridine ring moiety and can include monopyridine, dipyridine, and tripyridine ligands. Examples of the pyridine ligand include but are not limited to 2,2'-bypiridine, and 2,6-Di(2-pyridyl) pyridine.

The phosphine ligands as described herein refer to a molecule having at least one P(R$^4$)$_3$, and each R$^4$ is independently selected from the group consisting of hydrogen, optionally substituted $C_{1-15}$ alkyl, optionally substituted $C_{3-8}$ cycloalkyl, optionally substituted $C_{6-15}$ aryl, and optionally substituted 4-10 membered heteroaryl. The phosphine ligand can include monophosphine, bisphosphine, and trisphosphine. Examples of suitable phosphine ligand can include but are not limited to PH3, trimethylphosphine, triphenylphosphine, methyldiphenylphosphine, trifluorophosphine, trimethylphosphite, triphenylphosphite, tricyclohexylphosphine, dimethylphosphinomethane (dmpm), dimethylphosphinoethane (dmpe), PROPHOS, PAMP, DIPAMP, DIOP, DuPHOS, P(tBu)$_2$Ph, 1,2-B is (diphenylphosphino)ethane (dppe), 1,1'-B is (diphenylphosphino) ferrocene (dppf), 4-(tert-butyl)-2-(diisopropylphosphaneyl)-1H-imidazole, P(t-Bu)$_2$(C$_6$H$_5$).

In some embodiments of the method described herein, the isotope-containing agent is D$_2$O, DO(C$_1$-C$_{12}$ alkyl) (e.g., DOCH$_3$ or DOCD$_3$), T$_2$O, or TO(C$_1$-C$_{12}$ alkyl) (e.g., TOCH$_3$ or TOCT$_3$), or combinations thereof.

Reaction Medium

In some embodiments of the method described herein, the reaction of the polyunsaturated lipid with the isotope-containing agent is in an acidic reaction medium, such as an acidic aqueous solution, an acidic solvent, or an acidic solvent mixture, or combinations thereof. In some embodiments, the reaction medium may comprise one or more solvent selected from the group consisting of acetone, methanol, ethanol, 1-propanol, isopropanol, 2-butanol, 1,4-dioxane, acetonitrile, dichloromethane (DCM), toluene, dimethylsulfoxide (DMSO), acetic acid, dimethylcarbonate, ethyl acetate, ether, ethylene glycol, or N-methyl-2-pyrrolidone (NMP), and combinations thereof. In some such embodiments, In further embodiments, the reaction medium comprises heavy water (D$_2$O) and acetone. In some such embodiments, the acidic reaction medium comprises one or more pH modifiers selected from the group consisting of an organic acid, an inorganic acid, an Lewis acid, and combinations thereof. For example, acidification of heavy water could be done by introducing either a Lewis acid or certain amount of DC1 (deuterium chloride) in the overall reaction solution. The level of acidity will need to be balanced between the ability for the system to perform the deuteration and the stability of the catalyst in this acidified solution. The presence of C1 might interfere with the catalyst function as it might bind to the transition metal such as ruthenium. In such situation, use of a Lewis acid (e.g. B(C$_6$F$_5$)$_3$) might be more appealing because it is highly unlikely that will interfere with any catalytic functions.

Polyunsaturated Lipids

In some embodiments, the polyunsaturated lipid comprises a fatty acid, a fatty acid ester, a fatty acid thioester, a fatty acid amide, a fatty acid phosphate, or a phospholipid derivative of the fatty acid, or combinations thereof. In some further embodiments, the phospholipid contains a polyunsaturated fatty acid residue after an esterification or amidation reaction between the carboxyl group of the fatty acid and the hydroxyl or amino group of the phospholipid. In some such embodiments, the polyunsaturated lipid may have two or more carbon-carbon double bonds (such as 2, 3, 4, 5, 6, 7, 8, 9, or 10 carbon-carbon double bonds). In some further embodiments, the polyunsaturated lipid is an omega-3 fatty acid, an omega-6 fatty acid, or an omega-9 fatty acid, or an ester, amide, thioester, phosphate or phospholipid derivative thereof. In some embodiments, the polyunsaturated lipid is linoleic acid, linolenic acid, gamma linolenic acid, dihomo gamma linolenic acid, arachidonic acid, eicosapentaenoic acid, docosahexaenoic acid, or an ester thereof. In some further embodiments, the polyunsaturated fatty acid ester is an alkyl ester, a triglyceride, a diglyceride, or a monoglyceride.

In some embodiments of the method described herein, the polyunsaturated lipid is deuterated at one or more bis-allylic positions. In some such embodiments, the polyunsaturated lipid is deuterated at all bis-allylic positions. In some further embodiments, the polyunsaturated lipids further deuterated at one or more mono-allylic positions. In some embodiments, the deuterated polyunsaturated lipid is deuterated linoleic acid, deuterated linolenic acid, deuterated arachidonic acid, deuterated eicosapentaenoic acid, deuterated docosahexaenoic acid, or a salt or an ester thereof. In some further embodiments, the ester is an alkyl ester, a triglyceride, a diglyceride, or a monoglyceride. In further embodiments, the ester is an ethyl ester.

In some embodiments, the polyunsaturated lipid has a structure of Formula (III):

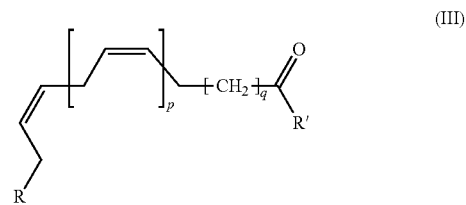

R is H or C$_1$-C$_{10}$ alkyl;
R' is —OR$^5$, —SR$^5$, —O(CH$_2$)CH(OR$^{6a}$)CH$_2$(OR$^{6b}$), —NR$^7$R$^8$,

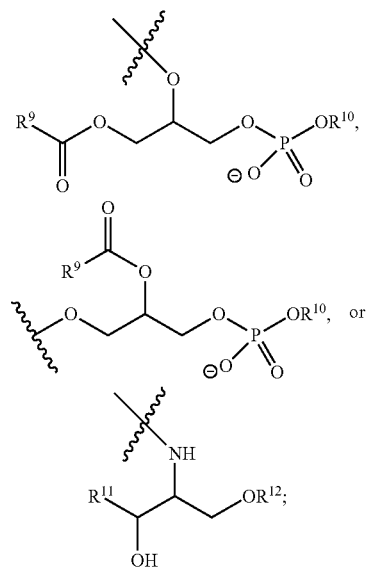

each R$^5$ is independently H, optionally substituted C$_1$-C$_{21}$ alkyl, optionally substituted C$_2$-C$_{21}$ alkenyl, optionally substituted C$_2$-C$_{21}$ alkynyl, optionally substituted C$_3$-C$_{10}$ cycloalkyl, optionally substituted C$_6$-C$^{10}$ aryl, optionally substituted 4 to 10 membered heteroaryl, optionally substituted 3 to 10 membered heterocyclyl, a mono-saccharide, a di-saccharide, or an oligosaccharide;

each of R$^{6a}$ and R$^{6b}$ is independently H, optionally substituted —C(=O)C$_1$-C$_{21}$ alkyl, optionally substituted —C(=O)C$_2$-C$_{21}$ alkenyl, or optionally substituted —C(=O) C$_2$-C$_{21}$ alkynyl;

each of R$^7$ and R$^8$ is independently H, optionally substituted C$_1$-C$_{21}$ alkyl, optionally substituted C$_2$-C$_{21}$ alkenyl, optionally substituted C$_2$-C$_{21}$ alkynyl, optionally substituted C$_3$-C$_{10}$ cycloalkyl, optionally substituted C$_6$-C$_{10}$ aryl, optionally substituted 4 to 10 membered heteroaryl, or optionally substituted 3 to 10 membered heterocyclyl; or R$^7$ and R$^8$ together with the nitrogen atom to which they are attached form an optionally substituted 3 to 10 membered heterocyclyl;

each R$^9$ is independently optionally substituted C$_1$-C$_{21}$ alkyl, optionally substituted C$_2$-C$_{21}$ alkenyl, optionally substituted C$_2$-C$_{21}$ alkynyl;

each R¹⁰ is independently H,

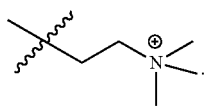 [SMILES: *CC[N+](C)(C)C]

—CH₂CH₂NH₂, —CH₂CH₂NH₃+, CH₂CH(NH₂)C(=O)O⁻, —CH₂CH(OH)CH₂OH, a mono-saccharide, a di-saccharide, or an oligosaccharide;

R¹¹ is optionally substituted $C_8$-$C_{21}$ alkyl, optionally substituted $C_8$-$C_{21}$ alkenyl, or optionally substituted $C_8$-$C_{21}$ alkynyl;

R¹² is H,

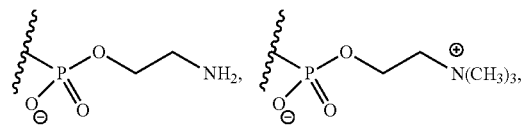

a mono-saccharide, a di-sacchardie, or an oligosaccharide; and each of p and q is independently an integer of 1, 2, 3, 4, 5, 6, 7, 8, 9 or 10.

In some embodiments of the polyunsaturated lipid of Formula (III), R is methyl, $C_4$ alkyl, or $C_7$ alkyl, each optionally substituted. In other embodiments, R is unsubstituted.

In some embodiments, the method yields deuterated linoleic acid or a derivative thereof of Formula (IIIa) (where R is n-butyl, p=1, and q=6):

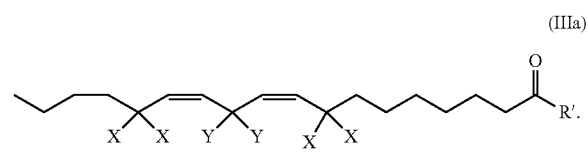

In some such embodiments, one or both Y is D. In some further embodiments, each X is H. In other embodiments, at least one of X is D. In some such embodiments, R' is —OR⁵, wherein R⁵ is H or optionally substituted $C_1$-$C_{21}$ alkyl. In one embodiment, R⁵ is ethyl. In one such embodiment, the deuterated polyunsaturated lipid is 11,11-D2-linoleic acid (D2-Lin), a pharmaceutically acceptable salt thereof, or ethyl ester thereof.

In some embodiments, the method yields deuterated linoleic acid or a derivative thereof of Formula (IIIb) (where R is methyl, p=2, and q=6):

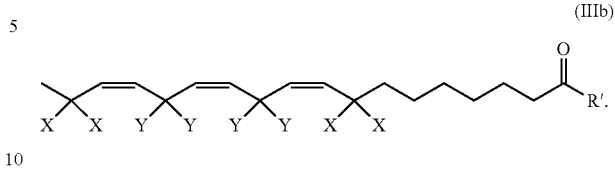

In some such embodiments, at least one Y is D. In some further embodiments, each Y is D. In some further embodiments, each X is H. In other embodiments, at least one of X is D. In some such embodiments, R' is —OR⁵, wherein R⁵ is H or optionally substituted $C_1$-$C_{21}$ alkyl. In one embodiment, R₅ is ethyl. In one such embodiment, the deuterated polyunsaturated lipid is 11,11,14,14-D4-linolenic acid, a pharmaceutically acceptable salt thereof, or ethyl ester thereof.

In some embodiments, the method yields deuterated arachidonic acid or a derivative thereof of Formula (IIIc) (where R is n-butyl, p=3, and q=2):

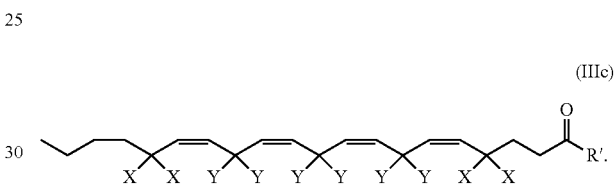

In some such embodiments, at least one Y is D. In some further embodiments, each Y is D. In some further embodiments, each X is H. In other embodiments, at least one of X is D. In some such embodiments, R' is —OR⁵, wherein R⁵ is H or optionally substituted $C_1$-$C_{21}$ alkyl. In one embodiment, R⁵ is ethyl. In one such embodiment, the deuterated polyunsaturated lipid is 7,7,10,10,13,13-D6-arachadonic acid, a pharmaceutically acceptable salt thereof, or ethyl ester thereof.

In some embodiments, the method yields deuterated eicosapentaenoic acid or a derivative thereof of Formula (IIId) (where R is methyl, p=4, and q=2):

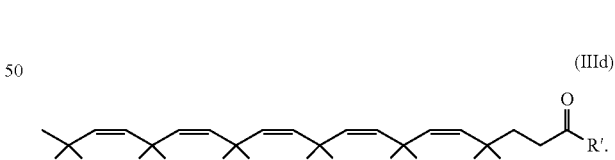

In some such embodiments, at least one Y is D. In some further embodiments, each Y is D. In some further embodiments, each X is H. In other embodiments, at least one of X is D. In some such embodiments, R' is —OR⁵, wherein R⁵ is H or optionally substituted $C_1$-$C_{21}$ alkyl. In one embodiment, R⁵ is ethyl. In one such embodiment, the deuterated polyunsaturated lipid is 7,7,10,10,13,13,16,16-D8-eicosapentaenoic acid, a pharmaceutically acceptable salt thereof, or ethyl ester thereof.

In some embodiments, the method yields deuterated docosahexaenoic acid or a derivative thereof of Formula (IIIe) (where R is methyl, p=5, and q=1):

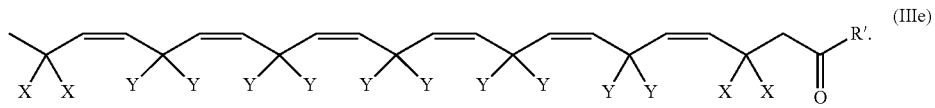

(IIIe)

In some such embodiments, at least one Y is D. In some further embodiments, each Y is D. In some further embodiments, each X is H. In other embodiments, at least one of X is D. In some such embodiments, R' is —OR$^5$, wherein R$^5$ is H or optionally substituted $C_1$-$C_{21}$ alkyl. In one embodiment, R$^5$ is ethyl. In one such embodiment, the deuterated polyunsaturated lipid is 6,6,9,9,12,12,15,15,18,18-D10-docosahexaenoic acid, a pharmaceutically acceptable salt thereof, or ethyl ester thereof.

In other embodiments of the polyunsaturated lipid of Formula (III), the polyunsaturated lipid is in the form of a glyceride ester, wherein R'=—O(CH$_2$)CH(OR$^{6a}$)CH$^2$(OR$^{6b}$). When each of R$^{6a}$ and R$^{6b}$ is H, such ester is a mono-glyceride, when only one of R$^{6a}$ and R$^{6b}$ is H, such ester is a di-glyceride. When neither R$^{6a}$ nor R$^{6b}$ is H, such ester is a tri-glyceride.

Mixture of Deuterated Polyunsaturated Lipids

In some embodiments, the catalytic method described herein yields a mixture of polyunsaturated lipids described herein. In some such embodiments, at least one polyunsaturated lipid in the mixture is deuterated at all bis-allylic positions. In some further embodiments, one or more polyunsaturated lipids in the mixture is further deuterated at one or more mono-allylic positions. In other embodiments, none of polyunsaturated lipids in the mixture is deuterated at one or more mono-allylic positions. In some such embodiments, the mixture of the polyunsaturated lipid comprises two or more species of the same fatty acid described herein or a derivative thereof, where the only difference between the various species is the number of deuterium at the bis-allylic and/or mono-allylic positions. For example, when the mixture comprise deuterated linolenic acid, it may comprises various species of linolenic acid, containing one to four deuterium atoms at the bis-allylic positions, such as the following species:

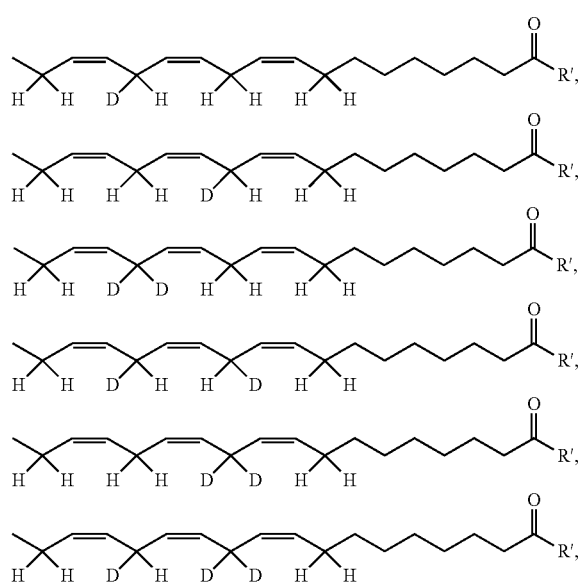

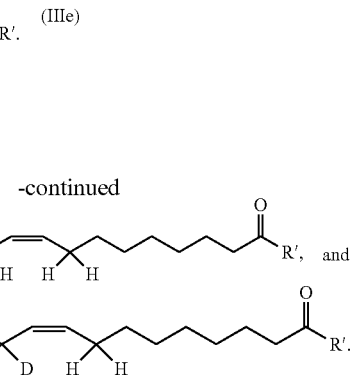

Similarly, when the mixtures comprises species of deuterated linoleic acid or derivative thereof, the mixtures may comprise combinations of various species of linoleic acid containing one or two deuterium atoms at the bis-allylic positions, or containing any one between one to six deuterium atoms at various bis-allylic and mono-allylic positions. When the mixture comprises species of deuterated arachidonic acid or derivative thereof, the mixtures may comprise combinations of various species of arachidonic acid containing one to six deuterium atoms at the bis-allylic positions, or containing any one between one to ten deuterium atoms at various bis-allylic and mono-allylic positions. When the mixture comprises species of deuterated eicosapentaenoic acid or derivative thereof, the mixtures may comprise combinations of various species of eicosapentaenoic acid containing one to eight deuterium atoms at the bis-allylic positions, or containing any one between one to twelve deuterium atoms at various bis-allylic and mono-allylic positions. When the mixture comprises species of deuterated docosahexaenoic acid or derivative thereof, the mixtures may comprise combinations of various species of docosahexaenoic acid containing one to ten deuterium atoms at the bis-allylic positions, or containing any one between one to fourteen deuterium atoms at various bis-allylic and mono-allylic positions. In some further embodiments, the method yields deuterated product predominantly at the bis-allylic positions. In some such embodiments, the method yields deuterated products with less than 30%, 25%, 20%, 15%, 10%, 9%, 8%, 7%, 6%, 5%, 4%, 3%, 2%, 1%, 0.5%, or 0.1% degree of deuteration at the mono-allylic positions.

In some embodiments of the mixture of polyunsaturated lipids described herein, the method yields a mixture has a degree of deuteration of at least 50% after the reaction is completed, for example, at least 50%, 55%, 60%, 65%, 70%, 75%, 80%, 85%, 90%, 95%, or 99% at the bis-allylic positions. In some further embodiments, the degree of deuteration is at least 70% at the bis-allylic positions. The term "deuteration degree", "degree of deuteration" of "level of deuteration" as used herein, refer to the percentage of deuterium atoms at the bis-allylic positions and/or mono-allylic positions of a compound as compared to the same compound without deuteration. It may be calculated as following:

degree of deuteration (%) at bis-allylic position=the number of deuterium atoms at the bis-allylic positions of a compound/the total number of hydrogen and deuterium atoms at the bis-allylic positions of the compound For a mixture containing deuterated compounds with various degree of deuteration (e.g., a mixture containing equal amount of Compounds A and B, having degree of deuteration of 33.3% and 66.7% respectively), the total or combined degree of deuteration of the mixture may be calculated as the following:

> molar percentage of Compound A*degree of deuteration of Compound A+molar percentage of Compound B*degree of deuteration of Compound B For example, if the product mixture contains the following three compounds in equal molar amount:

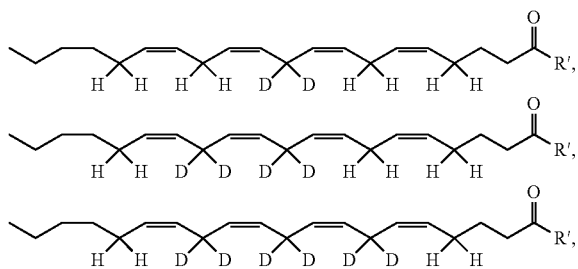

then the degree of deuteration at the bis-allylic position is 66.7%. A more practical way to determine the total percentage of deuteration is to rely on proton-carbon $^{13}$NMR bis-allylic peak integration measurements and mass-spectrometric methods.

Compositions

Some embodiments relate to a composition comprising one or more isotopically modified polyunsaturated lipids having an isotope predominantly at one or more bis-allylic positions, wherein the isotopically modified polyunsaturated lipids are prepared by a method of any one of claims. In some embodiments, the isotope is deuterium. In some embodiments, the isotope is tritium.

In some embodiments, the isotopically-modified polyunsaturated lipids in the composition described herein are deuterated predominantly at bis-allylic sites. In some embodiments, the composition described herein contains polyunsaturated lipid having two or more carbon-carbon double bonds. In some embodiments, the composition described herein contains polyunsaturated lipid having three or more carbon-carbon double bonds.

One will readily appreciate that when one of the two hydrogens of a methylene group is replaced with a deuterium atom, the resultant compound may possess a stereocenter. In some embodiments, it may be desirable to use racemic compounds. In other embodiments, it may be desirable to use enantiomerically pure compounds. In additional embodiments, it may be desirable to use diastereomerically pure compounds. In some embodiments, it may be desirable to use mixtures of compounds having enantiomeric excesses and/or diastereomeric excesses of about 5%, 10%, 15%, 20%, 25%, 30%, 35%, 40%, 45%, 50%, 65%, 60%, 65%, 70%, 75%, 80%, 85%, 90%, 95%, or 100%, or a range bounded by any two of the aforementioned percentages. In some embodiments, it may be preferable to utilize stereochemically pure enantiomers and/or diastereomers of embodiments—such as when enzymatic reactions or contacts with chiral molecules are being targeted for attenuating oxidative damage. However, in many circumstances, non-enzymatic processes and/or non-chiral molecules are being targeted for attenuating oxidative damage. In such circumstances, embodiments may be utilized without concern for their stereochemical purity. Moreover, in some embodiments, mixtures of enantiomers and diastereomers may be used even when the compounds are targeting enzymatic reactions and/or chiral molecules for attenuating oxidative damage.

In some aspects, isotopically modified compounds impart an amount of heavy atoms in a particular tissue upon administration. Thus, in some aspects, the amount of heavy molecules will be a particular percentage of the same type of molecules in a tissue. For example, the percentage of heavy molecules may be about at least 0.001%, 0.005%, 0.1%, 1%, 10%, 20%, 30%, 40%, or 50% of the same type of molecules (i.e., natural as opposed to isotopically modified) in a tissue.

Uses of Methods of Treatments

Some embodiments provide a method of treating, ameliorating or preventing a disease or condition associated with lipid peroxidation or lipid autooxidation in a subject in need thereof, comprising administering an effective amount of one or more isotopically modified polyunsaturated lipids described herein, or pharmaceutically acceptable salts thereof to the subject. In some embodiments, the isotopically modified polyunsaturated lipid(s) administered comprises from about 1% to about 99%, from about 1% to about 10%, or from about 1% to about 5% of the total amount of fats, fatty acids, and fatty acid esters administered to, or ingested by, the subject. In some further embodiments, the one or more isotopically modified polyunsaturated lipids described herein, or a pharmaceutically acceptable salt thereof, comprises less than about 5%, less than about 2%, or less than about 1% of the total amount of fats, fatty acids, and fatty acid esters administered to, or ingested by, the subject.

In some embodiments described herein, the disease or condition is a neurological condition or a neurodegenerative condition. In some further embodiments, the neurological condition is Alzheimer's disease, Parkinson's disease, Mild Cognitive Impairment (MCI), Frontotemporal Dementia, Amyotrophic Lateral Sclerosis (ALS), an ataxia (e.g., Friedreich's ataxia), Down syndrome, epilepsy, Huntington's disease, infantile neuroaxonal dystrophy (INAD), Alpers disease, schizophrenia, Wilson's disease, neurodegeneration with brain iron accumulation (NBIA), progressive supranuclear palsy (PSP), multiple sclerosis, Creutzfeld-Jakob's disease, Duchenne muscular dystrophy, Smith-Lemli-Opitz syndrome (SLOS), Rett syndrome, Gaucher Type 2, or Angelman syndrome. In some other embodiments, the neurodegenerative disease or condition related to tauopathy, for example, argyrophilic grain disease (AGD), chronic traumatic encephalopathy (CTE), corticobasal degeneration (CBD), frontotemporal dementia and parkinsonism linked to chromosome 17 (FTDP-17), ganglioglioma, gangliocytoma, lipofuscinosis, lytico-bodig disease, meningioangiomatosis, pantothenate kinase-associated neurodegeneration (PKAN), Pick's disease, postencephalitic parkinsonism, primary age-related tauopathy (PART), Steele-Richardson-Olszewski syndrome (SROS), and subacute sclerosing panencephalitis (SSPE).

In some embodiments described herein, the disease or condition is a lysosomal storage disorder. In some further embodiments, the lysosomal storage disorder is Batten disease, Nieman-Pick disease, Tay-Sachs disease, Sandhoff disease, or ataxia with vitamin E deficiency (AVED).

In some embodiments described herein, the disease or condition is a retinal condition. In some further embodiments, the retinal condition is retinitis pigmentosa, age-related macular degeneration, cataracts, diabetic retinopathy, Leber's hereditary optic neuropathy (LHON), Leber's congenital amaurosis, macular telangiectasia, Stargardt disease, glaucoma, optic neuropathies, or opthalmoplegias.

In some embodiments described herein, the disease or condition is pain. In some further embodiments, the pain is acute pain; neurogenic inflammation; chronic pain; dynamic, mechanical or thermal allodynia (pain that results from a stimulus that is not normally painful); or increased response to painful stimuli (such as hyperalgesia, fibromyalgia, and activation of the TRPA1 receptor).

In some embodiments described herein, the disease or condition is a sleep disorder. Non-limiting examples of the sleep disorder may include lifestyle related sleep deficiency; alcohol related sleep deficiency; idiopathic hypersomnia; narcolepsy; various sleep apneas; various parasomnias; restless leg syndrome; sleep state misperception; mood disorders such as depression; anxiety disorders; panic; psychoses such as schizophrenia; as well as circadian rhythm related sleep disorders, including jetlag related disorders and nightshift associated conditions.

In some embodiments described herein, the disease or condition is an impaired energy processing disorder or mitochondrial deficiency, for example: co-enzyme Q deficiency; mitochondrial complex IV deficiency; diabetes mellitus and deafness (DAD); Maternally Inherited Diabetes and Deafness (MIDD); Barth syndrome; Leigh syndrome; Kearns-Sayre syndrome (KSS); mitochondrial myopathy; mitochondrial encephalopathy; lactic acidosis; stroke-like episodes (MELAS); mitochondrial neurogastrointestinal encephalomyopathy (MNGIE); myoclonus epilepsy associated with ragged-red fibers (MERRF) syndrome; myoneurogenetic gastrointestinal encephalopathy (MNGIE) and neuropathy; Wolff-Parkinson-White syndrome and other cardiomyopathies; X-linked adrenoleukodystrophy (X-ALD), as well as diseases of musculoskeletal system (lipid myopathies, chronic fatigue, fibromyalgia syndrome); kidney (Fanconi's syndrome and glomerulonephropathies); blood (Pearson's syndrome, aceruloplasminemia, or sideroblastic anemia), and brain (migraines, seizures, and strokes).

In some embodiments described herein, the disease or condition is a hepatic disorder. Non-limiting examples of hepatic disorders include alcoholic fatty liver disease, non-alcoholic fatty liver disease, steatohepatitis, cirrhosis, hepatocellular carcinoma, obstructive jaundice, cholelitiasis, or a biliary tract disease.

In some embodiments described herein, the disease or condition is lipidemia or cardiac-related conditions, such as liporegulation disorders, lipotoxicity, ischemic heart disease, hypertension, atrial fibrillation, left ventricular hypertrophy, coronary artery disease, or atherosclerosis.

In some further embodiments, at least certain amount of the isotopically modified polyunsaturated lipid is incorporated into the subject's body following administration such that the incorporated compounds in the patient's body is sufficient to reduce or prevent lipid autoxidation of the natural (undeuterated) polyunsaturated fatty acid or ester in the subject's body. In some embodiments, the method also reduces ferroptosis.

Pharmaceutical Compositions

Some embodiments include pharmaceutical compositions comprising: (a) an effective amount of one or more isotopically modified polyunsaturated lipids described herein, or a pharmaceutically acceptable salt thereof; and (b) a pharmaceutically acceptable carrier, diluent, excipient or combination thereof. In some embodiments, the polyunsaturated lipid is 11,11-D2-linoleic acid or an ester thereof. In one particular embodiment, the polyunsaturated lipid is 11,11-D2-linoleic acid ethyl ester.

It is also contemplated that it may be useful to formulate the polyunsaturated lipid as a salt form. For example, the use of salt formation as a means of tailoring the properties of pharmaceutical compounds is well known. See Stahl et al., Handbook of pharmaceutical salts: Properties, selection and use (2002) Weinheim/Zurich: Wiley-VCH/VHCA; Gould, Salt selection for basic drugs, Int. J. Pharm. (1986), 33:201-217. Salt formation can be used to increase or decrease solubility, to improve stability or toxicity, and to reduce hygroscopicity of a drug product.

Formulation of polyunsaturated lipid(s) as salt(s) includes, but is not limited to, the use of basic inorganic salt forming agents, basic organic salt forming agents, and salt forming agents containing both acidic and basic functional groups. Various useful inorganic bases for forming salts include, but are not limited to, alkali metal salts such as salts of lithium, sodium, potassium rubidium, cesium, and francium, and alkaline earth metal salts such as berylium, magnesium, calcium, strontium, barium, and radium, and metals such as aluminum. These inorganic bases may further include counterions such as carbonates, hydrogen carbonates, sulfates, hydrogen sulfates, sulfites, hydrogen sulfites, phosphates, hydrogen phosphates, dihydrogen phosphates, phosphites, hydrogen phosphites, hydroxides, oxides, sulfides, alkoxides such as methoxide, ethoxide, and t-butoxide, and the like. Various useful organic bases for forming salts include, but are not limited to, amino acids, basic amino acids such as arginine, lysine, ornithine and the like, ammonia, alkylamines such as methylamine, ethylamine, dimethylamine, diethylamine, trimethylamine, triethylamine and the like, heterocyclic amines such as pyridine, picoline and the like, alkanolamines such as ethanolamine, diethanolamine, triethanolamine and the like, diethylaminoethanol, dimethylaminoethanol, N-methylglucamine, dicyclohexylamine, N,N'-dibenzylethylenediamine, ethylenediamine, piperazine, choline, trolamine, imidazole, diolamine, betaine, tromethamine, meglumine, chloroprocain, procaine, and the like.

Pharmaceutically acceptable salts are well known in the art and include many of the above-recited inorganic and organic bases. Pharmaceutically acceptable salts further include salts and salt-forming agents found in drugs approved by the Food and Drug Administration and foreign regulatory agencies. Pharmaceutically acceptable organic cations for incorporation include, but are not limited to, benzathine, chloroprocaine, choline, diethanolamine, ethylenediamine, meglumine, procaine, benethamine, clemizole, diethylamine, piperazine, and tromethamine. Pharmaceutically acceptable metallic cations for incorporation include, but are not limited to, aluminum, calcium, lithium, magnesium, potassium, sodium, zinc, barium, and bismuth. Additional salt-forming agents include, but are not limited to, arginine, betaine, carnitine, diethylamine, L-glutamine, 2-(4-imidazolyl)ethylamine, isobutanolamine, lysine, N-methylpiperazine, morpholine, and theobromine.

In addition to the selected compound useful as described above, some embodiments include compositions containing a pharmaceutically-acceptable carrier. The term "pharmaceutically-acceptable carrier", as used herein, means one or more compatible solid or liquid filler diluents or encapsulating substances, which are suitable for administration to a mammal. The term "compatible", as used herein, means that the components of the composition are capable of being commingled with the subject compound, and with each other, in a manner such that there is no interaction, which would substantially reduce the pharmaceutical efficacy of the composition under ordinary use situations. Pharmaceutically-acceptable carriers must, of course, be of sufficiently high purity and sufficiently low toxicity to render them suitable for administration preferably to an animal, preferably mammal being treated.

Pharmaceutically-acceptable carriers include, for example, solid or liquid fillers, diluents, hydrotropies, surface-active agents, and encapsulating substances. Some examples of substances, which can serve as pharmaceutically-acceptable carriers or components thereof, are sugars, such as lactose, glucose and sucrose; starches, such as corn starch and potato starch; cellulose and its derivatives, such as sodium carboxymethyl cellulose, ethyl cellulose, and methyl cellulose; powdered tragacanth; malt; gelatin; talc; solid lubricants, such as stearic acid and magnesium stearate; calcium sulfate; vegetable oils, such as peanut oil, cottonseed oil, sesame oil, olive oil, corn oil and oil of theobroma; polyols such as propylene glycol, glycerine, sorbitol, mannitol, and polyethylene glycol; alginic acid; emulsifiers, such as the TWEENS; wetting agents, such sodium lauryl sulfate; coloring agents; flavoring agents; tableting agents, stabilizers; antioxidants; preservatives; pyrogen-free water; isotonic saline; and phosphate buffer solutions.

Optional pharmaceutically-active materials may be included, which do not substantially interfere with the inhibitory activity of the compound. The amount of carrier employed in conjunction with the compound is sufficient to provide a practical quantity of material for administration per unit dose of the compound. Techniques and compositions for making dosage forms useful in the methods described herein are described in the following references, all incorporated by reference herein: Modern Pharmaceutics, 4th Ed., Chapters 9 and 10 (Banker & Rhodes, editors, 2002); Lieberman et al., Pharmaceutical Dosage Forms: Tablets (1989); and Ansel, Introduction to Pharmaceutical Dosage Forms 8th Edition (2004).

Various oral dosage forms can be used, including such solid forms as tablets, capsules, granules and bulk powders. Tablets can be compressed, tablet triturates, enteric-coated, sugar-coated, film-coated, or multiple-compressed, containing suitable binders, lubricants, diluents, disintegrating agents, coloring agents, flavoring agents, flow-inducing agents, and melting agents. Liquid oral dosage forms include aqueous solutions, emulsions, suspensions, solutions and/or suspensions reconstituted from non-effervescent granules, and effervescent preparations reconstituted from effervescent granules, containing suitable solvents, preservatives, emulsifying agents, suspending agents, diluents, sweeteners, melting agents, coloring agents and flavoring agents.

The pharmaceutically-acceptable carriers suitable for the preparation of unit dosage forms for peroral administration is well-known in the art. Tablets typically comprise conventional pharmaceutically-compatible adjuvants as inert diluents, such as calcium carbonate, sodium carbonate, mannitol, lactose and cellulose; binders such as starch, gelatin and sucrose; disintegrants such as starch, alginic acid and croscarmelose; lubricants such as magnesium stearate, stearic acid and talc. Glidants such as silicon dioxide can be used to improve flow characteristics of the powder mixture. Coloring agents, such as the FD&C dyes, can be added for appearance. Sweeteners and flavoring agents, such as aspartame, saccharin, menthol, peppermint, and fruit flavors, are useful adjuvants for chewable tablets. Capsules typically comprise one or more solid diluents disclosed above. The selection of carrier components depends on secondary considerations like taste, cost, and shelf stability, which are not critical, and can be readily made by a person skilled in the art.

Per-oral compositions also include liquid solutions, emulsions, suspensions, and the like. The pharmaceutically-acceptable carriers suitable for preparation of such compositions are well known in the art. Typical components of carriers for syrups, elixirs, emulsions and suspensions include ethanol, glycerol, propylene glycol, polyethylene glycol, liquid sucrose, sorbitol and water. For a suspension, typical suspending agents include methyl cellulose, sodium carboxymethyl cellulose, AVICEL RC-591, tragacanth and sodium alginate; typical wetting agents include lecithin and polysorbate 80; and typical preservatives include methyl paraben and sodium benzoate. Peroral liquid compositions may also contain one or more components such as sweeteners, flavoring agents and colorants disclosed above.

Such compositions may also be coated by conventional methods, typically with pH or time-dependent coatings, such that the subject compound is released in the gastrointestinal tract in the vicinity of the desired topical application, or at various times to extend the desired action. Such dosage forms typically include, but are not limited to, one or more of cellulose acetate phthalate, polyvinylacetate phthalate, hydroxypropyl methyl cellulose phthalate, ethyl cellulose, Eudragit coatings, waxes and shellac.

Compositions described herein may optionally include other drug actives or supplements. For example, the pharmaceutical composition is administered concomitantly with one or more antioxidants. In some embodiments, the antioxidant is selected from the group consisting of Coenzyme Q, idebenone, mitoquinone, mitoquinol, vitamin E, and vitamin C, and combinations thereof. In some such embodiments, at least one antioxidant may be taken concurrently, prior to, or subsequent to the administration of 11,11-D2-linoleic acid or the ester thereof. In some embodiments, the antioxidant and 11,11-D2-linoleic acid or the ester thereof may be in a single dosage form. In some embodiments, the single dosage form is selected from the group consisting of a pill, a tablet, and a capsule.

It will be understood by those of skill in the art that numerous and various modifications can be made without departing from the spirit of the present invention. Therefore, it should be clearly understood that the embodiments of the present invention disclosed herein are illustrative only and are not intended to limit the scope of the present invention. Any reference referred to herein is incorporated by reference for the material discussed herein, and in its entirety.

Co-Administration

In some embodiments, the polyunsaturated lipid(s) disclosed herein are administered in combination with one or more antioxidants.

Although antioxidants cannot cancel the negative effects of PUFA peroxidation due to the stochastic nature of the process and the stability of PUFA peroxidation products (reactive carbonyls) to antioxidant treatment, co-administration of antioxidants with compositions resistant to oxidation, such as those described herein, may prove beneficial for treating oxidative stress-related disorders.

Certain antioxidants contemplated as useful for co-administration include the following: vitamins, such as vitamin C and vitamin E; glutathione, lipoic acid, uric acid, carotenes, lycopene, lutein, anthocyanins, oxalic acid, phytic acid, tannins, coenzyme Q, melatonin, tocopherols, tocotrienols, polyphenols including resveratrol, flavonoids, selenium, eugenol, idebenone, mitoquinone, mitoquinol, ubiquinone, Szeto-S chiller peptides, and mitochondrial-targeted antioxidants. When not explicitly mentioned, quinone derivatives of the aforementioned antioxidants are also contemplated as useful for co-administration.

Kits

Some additional embodiments of the present disclosure relate to kits comprising a pharmaceutical composition, prescribing information, and a container, wherein the pharmaceutical composition comprises a therapeutically effective amount of one or more isotopically modified polyunsaturated lipids described herein. In some embodiments, isotopically modified polyunsaturated lipid is a deuterated polyunsaturated acid (PUFA) or an ester, thioester, amide, phosphate, or other prodrug thereof (such as a phospholipid derivative). In some further embodiment, the deuterated PUFA is 11,11-D2-linoleic acid and/or an ester thereof. In one particular embodiment, the isotopically modified PUFA is 11,11-D2-linoleic acid ethyl ester. In some embodiments, the prescribing information advises a subject to take the pharmaceutical composition with food, or take the pharmaceutical composition between meals. The kit may include one or more unit dosage forms comprising 11,11-D2-linoleic acid or the ester thereof. The unit dosage forms may be of an oral formulation. For example, the unit dosage forms may comprise pills, tablets, or capsules. The kit may include a plurality of unit dosage forms. In some embodiments, the unit dosage forms are in a container. In some embodiments, the dosage forms are single oral dosage forms comprising 11,11-D2-linoleic acid or the ester thereof, e.g., the ethyl ester.

The methods, compositions and kits disclosed herein may include information. The information may be in a form prescribed by a governmental agency regulating the manufacture, use, or sale of pharmaceuticals, which notice is reflective of approval by the agency of the form of the drug for human or veterinary administration. Such information, for example, may be the labeling approved by the U.S. Food and Drug Administration for prescription drugs, or the approved product insert. The information can include required information regarding dose and dosage forms, administration schedules and routes of administration, adverse events, contraindications, warning and precautions, drug interactions, and use in specific populations (see, e.g., 21 C.F.R. § 201.57 which is incorporated herein by reference in its entirety), and in some embodiments is required to be present on or associated with the drug for sale of the drug. In some embodiments, a kit is for sale of a prescription drug requiring the approval of and subject to the regulations of a governmental agency, such as the Food and Drug Administration of the United States. In some embodiments, the kit comprises the label or product insert required by the agency, such as the FDA, for sale of the kit to consumers, for example in the U.S. In preferred embodiments, the information instructs an individual to take 11,11-D2-linoleic acid or the ester thereof between meals, or with food, in order to reduce possible adverse event(s), for example gastrointestinal adverse event(s).

Instructions and/or information may be present in a variety of forms, including printed information on a suitable medium or substrate (e.g., a piece or pieces of paper on which the information is printed), computer readable medium (e.g., diskette, CD, etc. on which the information has been recorded), or a website address that may be accessed via the internet. Printed information may, for example, be provided on a label associated with a drug product, on the container for a drug product, packaged with a drug product, or separately given to the patient apart from a drug product, or provided in manner that the patient can independently obtain the information (e.g., a website). Printed information may also be provided to a medical caregiver involved in treatment of the patient. In some embodiments, the information is provided to a person orally.

Some embodiments comprise a therapeutic package suitable for commercial sale. Some embodiments comprise a container. The container can be in any conventional shape or form as known in the art which is made of a pharmaceutically acceptable material, for example a paper or cardboard box, a glass or plastic bottle or jar, a re-sealable bag (e.g., to hold a "refill" of tablets for placement into a different container), or a blister pack with individual dosages for pressing out of the pack according to a therapeutic schedule. The container employed can depend on the exact dosage form involved, e.g., a conventional cardboard box would not generally be used to hold a liquid suspension. It is feasible that more than one container can be used together in a single package to market a single dosage form. For example, tablets may be contained in a bottle which is in turn contained within a box.

The information can be associated with the container, for example, by being: written on a label (e.g., the prescription label or a separate label) adhesively affixed to a bottle containing a dosage form described herein; included inside a container as a written package insert, such as inside a box which contains unit dose packets; applied directly to the container such as being printed on the wall of a box; or attached as by being tied or taped, e.g., as an instructional card affixed to the neck of a bottle via a string, cord or other line, lanyard or tether type device. The information may be printed directly on a unit dose pack or blister pack or blister card.

What is claimed is:

1. A ruthenium complex of the formula I:

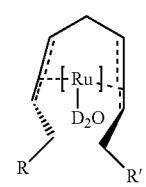

I wherein R and R' comprise the remainder of linolenic acid, arachidonic acid, eicosapentaenoic acid, or docosahexaenoic acid or an ester thereof; wherein when present, the ester is a $C_1$-$C_{21}$ alkyl ester;
wherein the ruthenium complex further comprises a cyclopentadiene (Cp) ligand; and
wherein ruthenium in the ruthenium complex is in the +1 oxidation state ($Ru^{+1}$).

2. The complex of claim 1, wherein R and R' comprise the remainder of linolenic acid.

3. The complex of claim 1, wherein R and R' comprise the remainder of arachidonic acid.

4. The complex of claim 1, wherein R and R' comprise the remainder of eicosapentaenoic acid.

5. The complex of claim 1, wherein R and R' comprise the remainder of docosahexaenoic acid.

6. The complex of claim 1, wherein R and R' comprise the remainder of linolenic $C_1$-$C_{21}$ alkyl ester.

7. The complex of claim 1, wherein R and R' comprise the remainder of arachidonic $C_1$-$C_{21}$ alkyl ester.

8. The complex of claim 1, wherein R and R' comprise the remainder of eicosapentaenoic $C_1$-$C_{21}$ alkyl ester.

9. The complex of claim 1, wherein R and R' comprise the remainder of docosahexaenoic $C_1$-$C_{21}$ alkyl ester.

10. The complex of claim 1, wherein R and R' comprise the remainder of linolenic ethyl ester.

11. The complex of claim 1, wherein R and R' comprise the remainder of arachidonic ethyl ester.

12. The complex of claim 1, wherein R and R' comprise the remainder of eicosapentaenoic ethyl ester.

13. The complex of claim 1, wherein R and R' comprise the remainder of docosahexaenoic ethyl ester.

* * * * *